(12) United States Patent
Aminaka

(10) Patent No.: US 8,885,545 B2
(45) Date of Patent: Nov. 11, 2014

(54) RADIO COMMUNICATION SYSTEM, COMMUNICATION APPARATUS, METHOD FOR CONTROLLING SIMULTANEOUS TRANSMISSION FROM MULTIPLE BASE STATIONS, AND NON-TRANSITORY COMPUTER READABLE MEDIUM

(75) Inventor: Hiroaki Aminaka, Tokyo (JP)

(73) Assignee: NEC Corporation, Tokyo (JP)

( * ) Notice: Subject to any disclaimer, the term of this patent is extended or adjusted under 35 U.S.C. 154(b) by 117 days.

(21) Appl. No.: 13/636,934

(22) PCT Filed: Feb. 21, 2011

(86) PCT No.: PCT/JP2011/000959
§ 371 (c)(1),
(2), (4) Date: Sep. 24, 2012

(87) PCT Pub. No.: WO2011/125278
PCT Pub. Date: Oct. 13, 2011

(65) Prior Publication Data
US 2013/0010702 A1    Jan. 10, 2013

(30) Foreign Application Priority Data

Apr. 9, 2010    (JP) .................................. 2010-090346

(51) Int. Cl.
*H04W 88/16* (2009.01)
*H04W 76/02* (2009.01)

(52) U.S. Cl.
CPC .................................. *H04W 76/025* (2013.01)
USPC ........... 370/315; 370/328; 370/341; 370/401; 455/13.1; 455/436; 455/445

(58) Field of Classification Search
None
See application file for complete search history.

(56) References Cited

U.S. PATENT DOCUMENTS

| 8,437,371 | B2* | 5/2013 | Wang et al. ................... 370/509 |
| 2001/0007552 | A1* | 7/2001 | Schiff et al. ................... 370/331 |
| 2008/0139173 | A1* | 6/2008 | Yokobori et al. ............. 455/411 |

OTHER PUBLICATIONS

3GPP; Technical Specification Group Radio Access Network, Evolved Universal Terrestrial Radio Access (E-UTRA) and Evolved Universal Terrestrial Radio Access Network (E-UTRAN); Overall Description; Stage 2 (Release 8), pp. 19-23, V8.11.0.
Research in Motion UK Limited; Discussion of Handover for CoMP, 3GPP TSG RAN WG2 Meeting #67 R2-094282, 2009, entire text, Shenzhen, China.
3GPP; Technical Specification Group Radio Access Network; Further Advancements for E-UTRA Physical Layer Aspects (Release 9), 2009, 53 pgs., V1.5.0.
International Search Report for PCT/JP2011/000959 dated May 10, 2011.

\* cited by examiner

*Primary Examiner* — Phuc Tran
*Assistant Examiner* — Shick Hom
(74) *Attorney, Agent, or Firm* — Sughrue Mion, PLLC

(57) ABSTRACT

A first GW function block (6) transmits packet data to a first base station (1). A second GW function block (7) is able to communicate with the first base station (1), a second base station (2), and the first GW function block (6). A control function block (5) signals information related to a communication path configuration to transfer the packet data. Setup of a communication path, to transmit the packet data to the base station (1) from the GW function block (6) through the GW function block (7), is performed based on first packet data communication information signaled by the control function block (5). Setup of a communication path, to transmit the packet data to the base station (2) from the GW function block (7), is performed based on at least one of the first packet data communication information, second packet data communication information signaled by the control function block (5) to the base station (1), and third packet data communication information signaled by the control function block (5) to the GW function block (7).

26 Claims, 21 Drawing Sheets

RADIO COMMUNICATION SYSTEM, COMMUNICATION APPARATUS, METHOD FOR CONTROLLING SIMULTANEOUS TRANSMISSION FROM MULTIPLE BASE STATIONS, AND NON-TRANSITORY COMPUTER READABLE MEDIUM

CROSS REFERENCE TO RELATED APPLICATIONS

This application is a National Stage of International Application No. PCT/JP2011/000959 filed Feb. 21, 2011, claiming priority based on Japanese Patent Application No. 2010-090346 filed Apr. 9, 2010, the contents of all of which are incorporated herein by reference in their entirety.

TECHNICAL FIELD

The present invention relates to a radio communication system including multiple base stations, and particularly to control of simultaneous data transmission from multiple base stations.

BACKGROUND ART

As a Study Item on LTE-Advanced (Long Term Evolution Advanced) by 3GPP (3rd Generation Partnership Project), standardization of Coordinated multi-point transmission/reception (CoMP) has been examined as one of techniques aiming to increase communication speed of cell-edge mobile station (hereinafter referred to as user equipment (UE)) and improve cell throughput of base stations (hereinafter referred to as eNB: Evolved Node B), for example (see Non Patent Literature 1). An overview of CoMP under examination in LTE-Advanced by 3GPP is explained hereinafter.

In a network introducing CoMP, a scenario for transmitting data to the same UE from multiple transmission points (e.g., eNB or Remote Radio Head (RRH)) at the same timing has been examined as one of CoMP introducing scenarios (Joint Processing (JP)). CoMP using multiple RRHs controlled by the same eNB is referred to as Intra-eNB CoMP, and CoMP among multiple eNBs is referred to as Inter-eNB CoMP. When Joint Processing is performed in Inter-eNB CoMP, it is assumed that one base station controls an UE and remaining base station(s) does not control the UE but transmit data. In this specification, an eNB that controls the target UE is referred to as a Serving eNB, and other eNB not controlling the UE is referred to as a CoMP eNB. The Serving eNB and the CoMP eNB transmit data at the same timing, and the UE receives the data from both eNBs, thereby improving downlink throughput.

FIG. 1 shows a network configuration diagram of a mobile communication system based on a background art as an example. A Serving eNB 901 forms a Serving eNB cell 911, and a CoMP eNB 902 forms a CoMP eNB cell 921. A UE 903 receives data transmitted at the same timing from the Serving eNB cell 911 and the CoMP eNB cell 921. The Serving eNB 901 and the CoMP eNB 902 are each connected to a core network 904 via an access line such as an IP (Internet Protocol) network and relay traffic between the UE 903 and the core network 904. The core network 904 includes a network apparatus (Mobility Management Entity (MME) 905) for controlling the Serving eNB 901 and the CoMP eNB 902, and a Serving Gateway/Packet Data Network Gateway (S/P-GW) 906 for forwarding user data (packet data) to the Serving eNB 901 and the CoMP eNB 902. The MME 905, which is a controlling entity for performing mobility management including UE attach and handover and bearer management, communicates control data with the Serving eNB 901 and the CoMP eNB 902. The S/P-GW 906 is a data transfer entity that transfers user data from/to an external network (PDN: Packet Data Network) to/from the Serving eNB 901 and the CoMP eNB 902.

CITATION LIST

Non Patent Literature

Non Patent Literature 1: 3GPP TR 36.814 v1.5.0 (2009-11), "Further Advancements for E-UTRA Physical Layer Aspects"

SUMMARY OF INVENTION

Technical Problem

The inventor has closely examined an S1 bearer that is established between the S/P-GW 906 and the CoMP eNB 902 in the case of performing Joint Processing in Inter-eNB CoMP. Two architectures can be considered when an existing network is diverted. These architectures are shown in FIGS. 2A and B. The dashed-line arrows indicate control signals (C-Plane), and the solid-line arrows indicate data signals (U-Plane). In architecture 1 shown in FIG. 2A, the S/P-GW 906 sets up a bearer to the CoMP eNB 902. In architecture 2 shown in FIG. 2B, the Serving eNB 901 forwards data to the CoMP eNB 902. In the case of FIG. 2B, the Serving eNB 901 and the CoMP eNB 902 may forward data using the X2 interface that is specified in the 3GPP Release 8.

In the architecture 1, the S/P-GW 906 has to establish at least two bearers in order to transmit the same data to the same UE 903 through different routes. However, in the specification of the 3GPP Release 8, the bearer between the S/P-GW 906 and the UE 903 with the same QCI (QoS Class Identifier) is mapped one-to-one to the S1 bearer. Therefore, a control method different from the background art is required to realize the architecture 1, thereby requiring a specification change on core network apparatuses (hereinafter referred to as core nodes) including an S/P-GW and an MME.

On the other hand, in the architecture 2, as the S/P-GW 906 establishes the bearer only to the Serving eNB 901, an impact of the specification change on the S/P-GW 906 is small. However, as the Serving eNB 901 forwards received data to the CoMP eNB 902 via the X2 interface, forwarding delay comes up. Consequently, there is a delay difference between the data reaching the Serving eNB 901 and the data reaching the CoMP eNB 902 from the S/P-GW 906. Therefore, it is difficult to transmit the data to the same UE 903 at the same timing from the eNBs 901 and 902.

As a result of the inventor's examination, it is considered to be difficult, in the architectures 1 and 2 diverting the existing network, to realize CoMP with a small impact of the specification change on core nodes and also with a small delay difference between the data reaching the Serving eNB and the CoMP eNB.

The present invention is made based on the aforementioned consideration by the inventor. That is, an object of the present invention is to provide a radio communication system, a method for controlling simultaneous transmission from multiple base station apparatuses, and a program, realizing a bearer setup method capable of reducing the impact of the specification change on the core nodes and reducing the delay difference between the data reaching the Serving eNB and the CoMP eNB when Inter-eNB CoMP is performed.

Solution to Problem

A first aspect of the present invention includes a radio communication system. The radio communication system includes first and second base stations, a first gateway function block, a second gateway function block, and a control function block.

Each of the first and second base stations is able to wirelessly transmit packet data addressed to a mobile station. The first gateway function block is configured to transmit the packet data to the first base station. The second gateway function block is able to communicate with the first base station, the second base station and the first gateway function block. The control function block is configured to signal information related to a communication path configuration to transfer the packet data. Setup of a communication path, to transmit the packet data to the first base station from the first gateway function block through the second gateway function block, is performed based on first packet data communication information signaled by the control function block.

Further, Setup of a communication path, to transmit the packet data to the second base station from the second gateway function block, is performed based on at least one of the first packet data communication information, second packet data communication information signaled by the control function block to the first base station, and third packet data communication information signaled by the control function block to the second gateway function block.

A second aspect of the present invention includes a communication apparatus. The communication apparatus is able to communicate with first and second base stations capable of wirelessly transmitting packet data addressed to a mobile station, a gateway function block for transmitting the packet data to the first base station, and a control function block for signaling information related to a communication path configuration to forward the packet data. The communication apparatus includes a control unit and a transmission unit.

The control unit is configured to set up a communication path to transmit the packet data to the second base station from the communication apparatus based on at least one of first to third packet data control information. Further, the transmission unit transmits the packet data transmitted from the gateway function block to the first and second base stations.

The first packet data communication information is related to a communication path to transmit the packet data to the first base station from the gateway function block through the communication apparatus and is signaled by the control function block. The second packet data communication information is related to a communication path to transmit the packet data to the second base station from the communication apparatus and is signaled by the control function block to the first base station. Moreover, the third packet data communication information is signaled by the control function block to the communication apparatus.

A third aspect of the present invention includes a method for controlling simultaneous transmission from multiple base stations performed by a communication apparatus. The communication apparatus is disposed communicatively with first and second base stations capable of wirelessly transmitting packet data addressed to a mobile station, a gateway function block for transmitting the packet data to the first base station, and a control function block for signaling information related to a communication path configuration to transfer the packet data.

The control method includes:

(a) setting up a communication path to transmit the packet data to the second base station from the communication apparatus based on at least one of first to third packet data control information, and (b) transmitting the packet data transmitted from the gateway function block to the first and second base stations.

The first packet data communication information is related to a communication path to transmit the packet data to the first base station from the gateway function block through the communication apparatus and is signaled by the control function block. The second packet data communication information is related to a communication path to transmit the packet data to the second base station from the communication apparatus and is signaled by the control function block to the first base station. Further, the third packet data communication information is signaled by the control function block to the communication apparatus.

A fourth aspect of the present invention includes a program for causing a computer to execute the method according to the aforementioned third aspect of the present invention.

Advantageous Effects of Invention

According to the aforementioned aspects of the present invention, it is possible to provide a radio communication system, a method for controlling simultaneous transmission from multiple base station apparatuses, and a program, reducing the delay difference between the data reaching the Serving eNB and the CoMP eNB while reducing the impact of the specification change on the core node when CoMP is performed among the multiple base stations.

DESCRIPTION OF EMBODIMENTS

Figure 1:
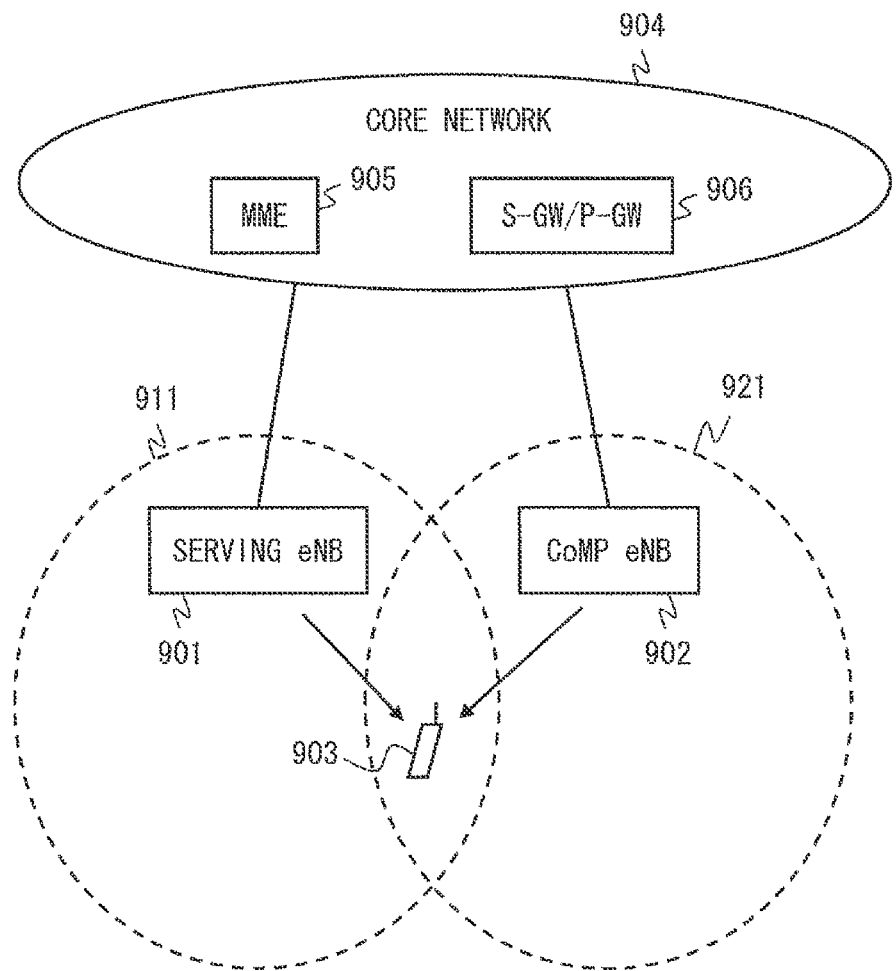
FIG. 1 is a network configuration diagram according to a background art.
Figure 2A:
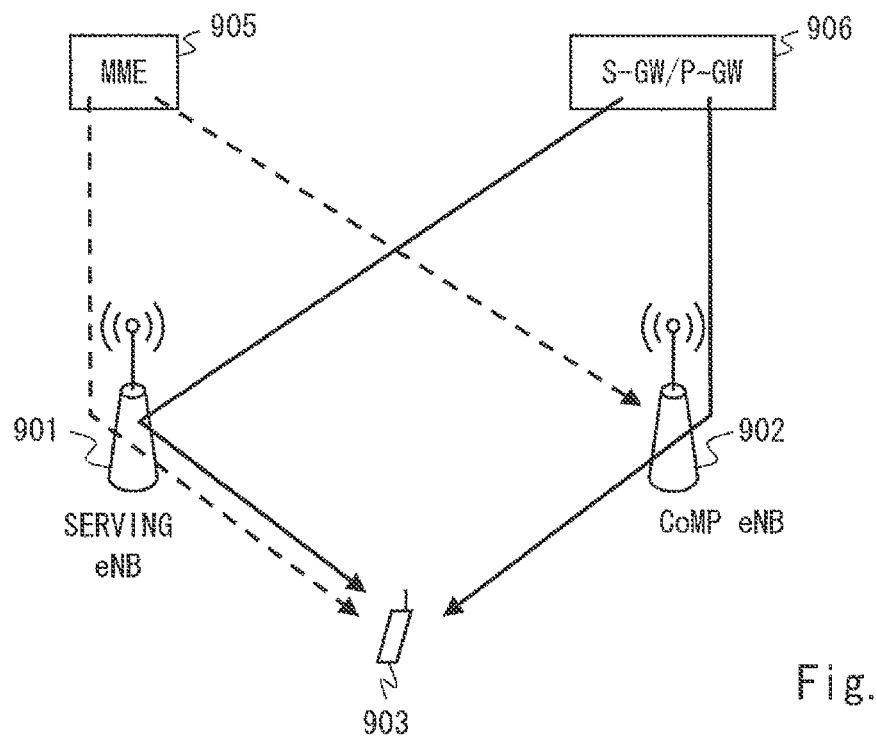
FIG. 2A is a diagram showing an expected CoMP architecture diverting a network according to an exemplary embodiment.
Figure 2B:
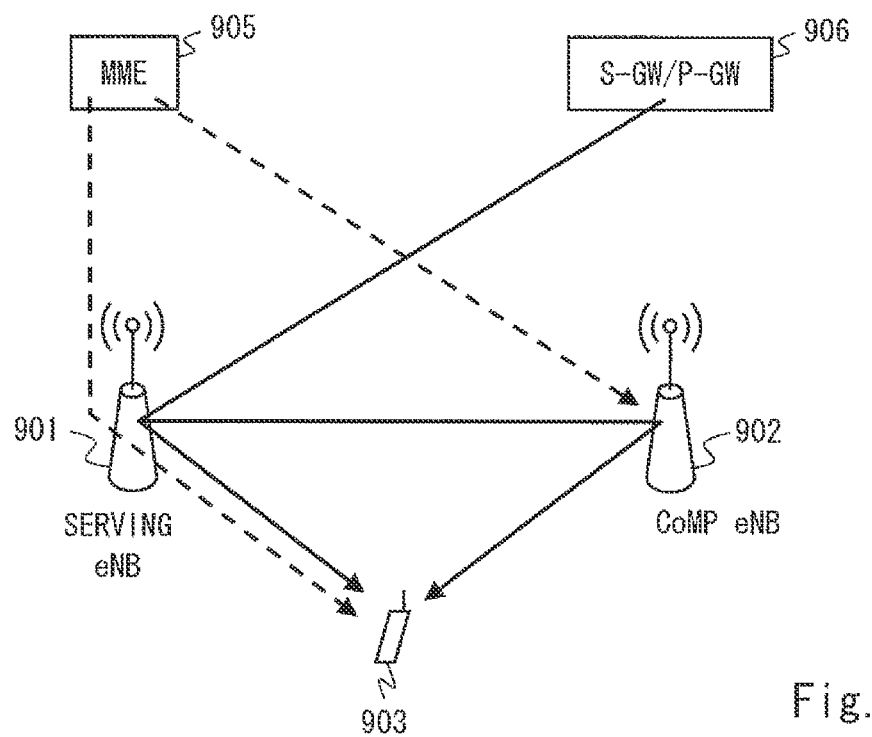
FIG. 2B is a diagram showing an expected CoMP architecture diverting a network according to an exemplary embodiment.
Figure 3:
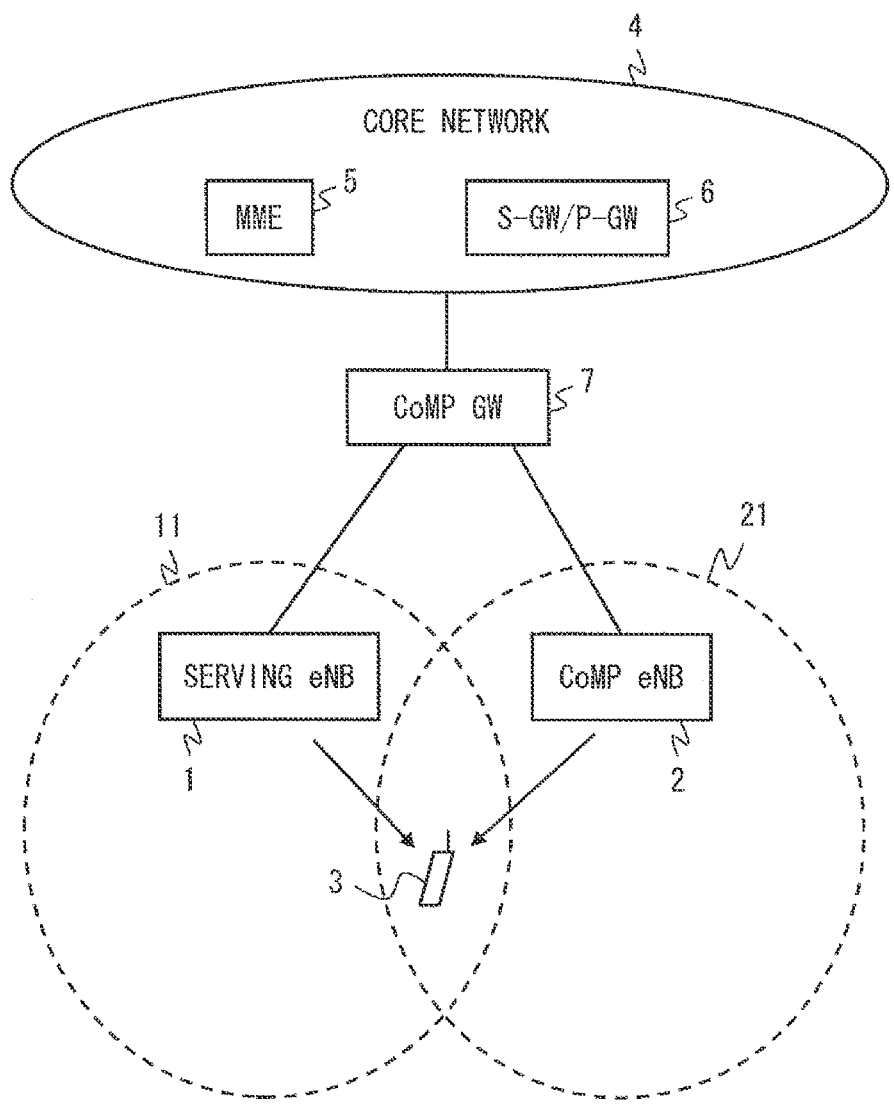
FIG. 3 is a network configuration diagram according to an embodiment of the present invention.

Hereinafter, embodiments of the present invention are explained with reference to the drawings. FIG. 3 is a diagram showing a network configuration example of a mobile communication system according to this embodiment. FIG. 3 shows a case where the mobile communication system according to this embodiment is an EPS (Evolved Packet System). Note that, for simplification of the explanation, FIG. 3 only illustrates one Serving eNB 1 and one CoMP eNB 2. However, in general, multiple eNBs may be disposed and each of them can be the Serving eNB 1 or the CoMP eNB 2. Moreover, in general, there are multiple UEs 3 which receive downlink data from the Serving eNB cell 11 and the CoMP eNB cell 21.

The Serving eNB 1 forms the Serving eNB cell 11 and performs bidirectional radio communication with the UE 3. The CoMP eNB 2 has functions equivalent to those of a normal eNB but transmits only data and not control information to the UE 3 that is performing CoMP. The Serving eNB 1 and the CoMP eNB 2 are each connected to a core network 4 via an access line such as an IP (Internet Protocol) network and relays traffic between the UE 3 and the core network 4. The core network 4 includes an MME 5 and an S/P-GW 6.

A CoMP GW 7 is a logical node disposed between the core network 4 and the Serving eNB 1 and the CoMP eNB 2. The CoMP GW 7 relays user data and control data between each of the Serving eNB 1 and the CoMP eNB 2 and the core network 4.

Figure 4:
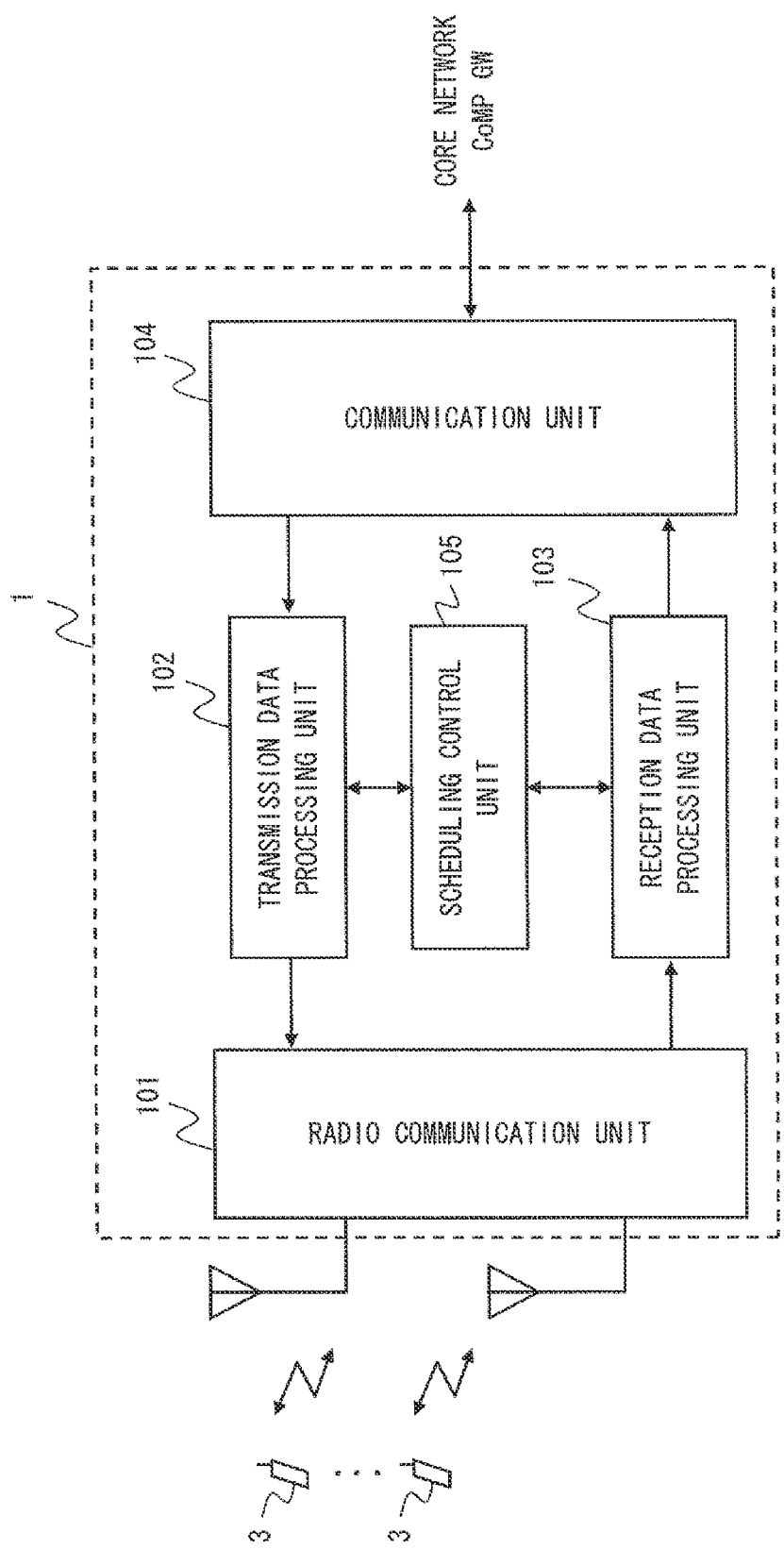
FIG. 4 is a block diagram showing a configuration example of a Serving eNB 1 shown in FIG. 3.

FIG. 4 is a block diagram showing a configuration example of the Serving eNB 1 according to first to fourth embodiments. In FIG. 4, a radio communication unit 101 performs processes, including mapping to a resource element, OFDM signal generation (Inverse Discrete Fourier Transform (IDFT)), frequency conversion, and signal amplification, to a transmission symbol sequence of a physical channel supplied from a transmission data processing unit 102, and thereby generates a downlink signal. The generated downlink signal is transmitted wirelessly from an antenna. Further, the radio communication unit 101 receives an uplink signal transmitted from the UE 3 and restores a reception symbol sequence.

The transmission data processing unit 102 obtains the user data transmitted to the UE 3 from a communication unit 104 and obtains scheduling information including information about transmission timing of the user data and a resource block to be used from a scheduling control unit 105. The transmission data processing unit 102 performs error correction coding, rate matching, interleaving, and the like to the transmission data, and thereby generates a transport channel. Further, the transmission data processing unit 102 performs scrambling and modulation symbol mapping to a data sequence of the transport channel, and thereby generates a transmission symbol sequence for each of physical channels (e.g., PBCH (Physical Broadcast Channel), PDCCH (Physical Downlink Control Channel), and PDSCH (Physical Downlink Shared Channel)).

The reception data processing unit 103 restores reception data for each logical channel from the reception symbol sequence supplied from the radio communication unit 101. User traffic data and a part of the control data, included in the obtained reception data, are transferred to the core network 4 or the CoMP GW 7 through the communication unit 104.

The scheduling control unit 105 holds user data control information received from the MME 5 through the communication unit 104. The scheduling control unit 105 sets up a communication path (i.e., S1 bearer) for receiving the user data from the S/P-GW 6 through the CoMP GW 7 based on the user data control information received from the MME 5. Further, the scheduling control unit 105 establishes a radio channel (i.e., radio bearer) for transmitting the user data to the UE 3 based on the received user data control information. Moreover, the scheduling control unit 105 controls the transmission timing of the user data to be transmitted to the UE 3, the resource block to be used, and the like and transmits the user data to the UE 3 based on the scheduling information. The scheduling control unit 105 transmits the scheduling information to the CoMP eNB 2 through the communication unit 104.

In the case of LTE Advanced, user data control information notified to the Serving eNB 1 from the MME 5 includes configuration information of an EPS bearer that reaches the UE 3 from the S/P-GW 6 through the CoMP GW 7 and the Serving eNB 1. To state more specifically, the user data control information notified to the Serving eNB 1 from the MME 5 includes at least one of: an APN (Access Point Name), an IP address of the UE 3, a GUTI (Globally Unique Temporary Identity), and a bearer identifier. The MME 5 signals the user data control information to the Serving eNB 1 using a control plane interface (S1-MME interface) between the MME 5 and the Serving eNB 1. Note that the user data control information is not limited to the configuration information for configuring a bearer that is terminated at the S/P-GW 6 and the UE 3. For example, the user data control information may include configuration information for configuring a bearer that is terminated at the CoMP GW 7 or the Serving eNB 1. Alternatively, the user data control information may include configuration information for configuring a bearer composing a part of a section instead of the bearer between the CoMP GW 7 and the UE 3.

Figure 5:
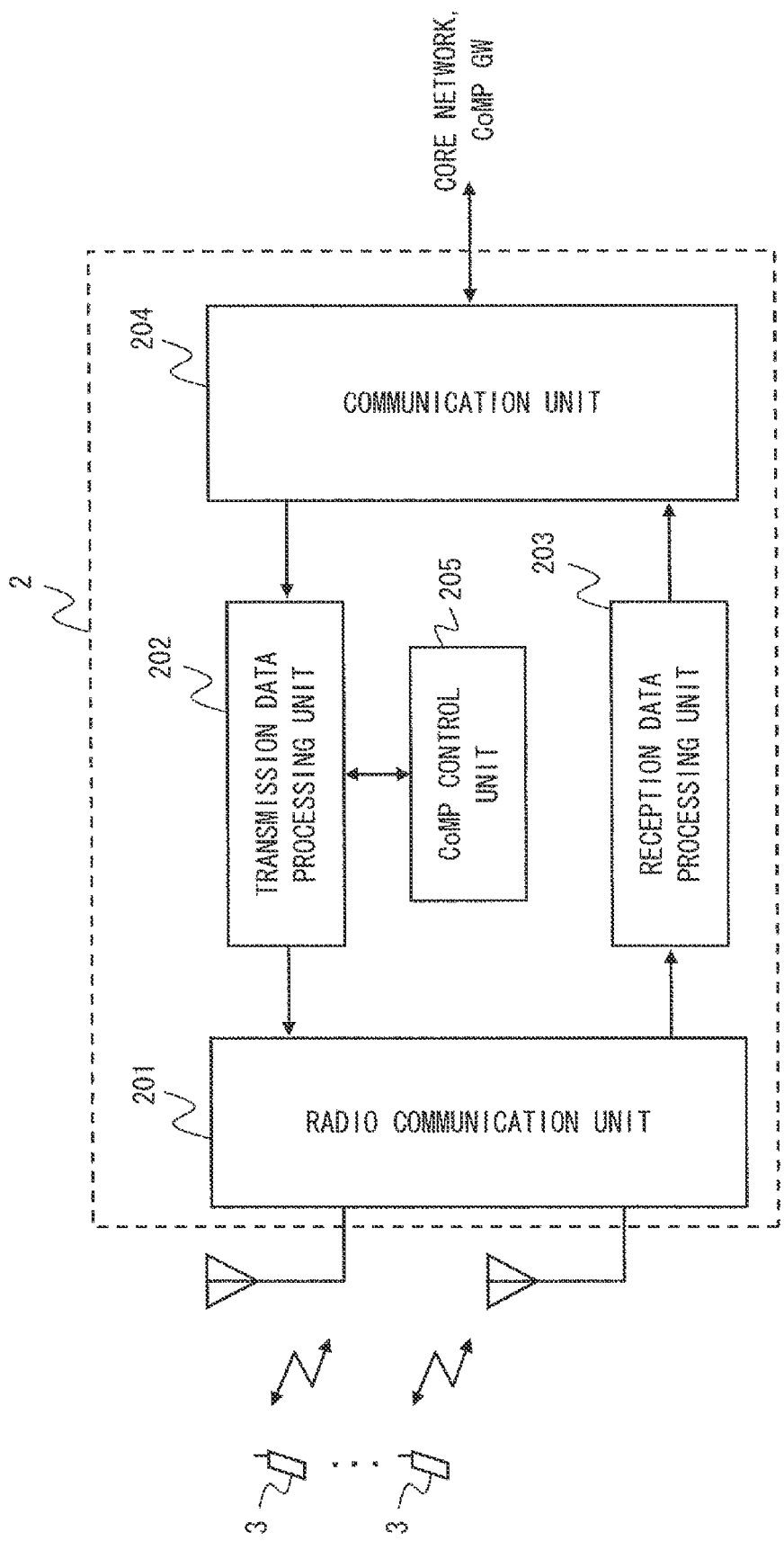
FIG. 5 is a block diagram showing a configuration example of a CoMP eNB 2 shown in FIG. 3.

FIG. 5 is a block diagram showing a configuration example of a CoMP eNB 2 according to the first to fourth embodiments. In FIG. 5, the functions of the radio communication unit 201 are similar to those of the radio communication unit 101. However, the mode of not transmitting PDCCH as the physical channel can be employed. The transmission data processing unit 202 obtains the user data transmitted to the UE 3 from the communication unit 204, obtains the scheduling information including information about the transmission timing of the user data and the resource block to be used from a CoMP control unit 205, and transmits the user data to the UE 3. The reception data processing unit 203 is similar to the reception data processing unit 103. The CoMP control unit 205 holds the scheduling information notified from the Serving eNB 1 through the communication unit 204 and CoMP configuration information notified from the MME 6 or the CoMP GW 7. The CoMP control unit 205 sets up a communication path (i.e., bearer for CoMP) for receiving the user data from the CoMP GW 7 based on the CoMP configuration information notified from the MME 6 or the CoMP GW 7. Further, the CoMP control unit 205 sets up a downlink radio channel for transmitting the user data to the UE 3 based on the received CoMP configuration information. Note that the CoMP eNB 2 does not need to set up the downlink radio channel for CoMP beforehand with the UE 3. This is because that when the user data transmission by the CoMP eNB 2 is performed using the same resource block as the Serving eNB 1, the UE 3 can receive the resource block transmitted from the CoMP eNB 2 without establishing the downlink radio channel beforehand by signaling with the CoMP eNB 2. The CoMP control unit 205 transmits the user data to the UE 3 using the configured communication path and radio channel.

In the case of LTE Advanced, the CoMP configuration information notified to the CoMP eNB 2 from the MME 5 or the CoMP GW 7 includes configuration information of the bearer that reaches the UE 3 from the CoMP GW 7 through the CoMP eNB 2. To state more specifically, the CoMP configuration information notified from the MME 5 to the CoMP eNB 2 includes the APN (Access Point Name), the IP address of the UE 3, the GUTI (Globally Unique Temporary Identity), the bearer identifier, and the like. When the MME 5 notifies the CoMP eNB 2 of the CoMP configuration information, the MME 5 may signal the CoMP configuration information to the CoMP eNB 2 using a control plane interface (S1-MME interface) between the MME 5 and the CoMP eNB 2. Further, when the CoMP GW 7 notifies the CoMP eNB 2 of the CoMP configuration information, the CoMP GW 7 may signal the CoMP configuration information to the CoMP eNB 2 using a control plane interface between the CoMP GW 7 and the CoMP eNB 2. Note that the CoMP control information is not limited to the configuration information for configuring the bearers that respectively terminate at the CoMP GW 7 and the UE 3. For example, the user data control information may include the configuration information for configuring a bearer that is terminated at the CoMP GW 7. Alternatively, the user data control information may include configuration information for configuring the bearer composing a part of a section instead of the bearer between the CoMP GW 7 and the UE 3.

Figure 6:
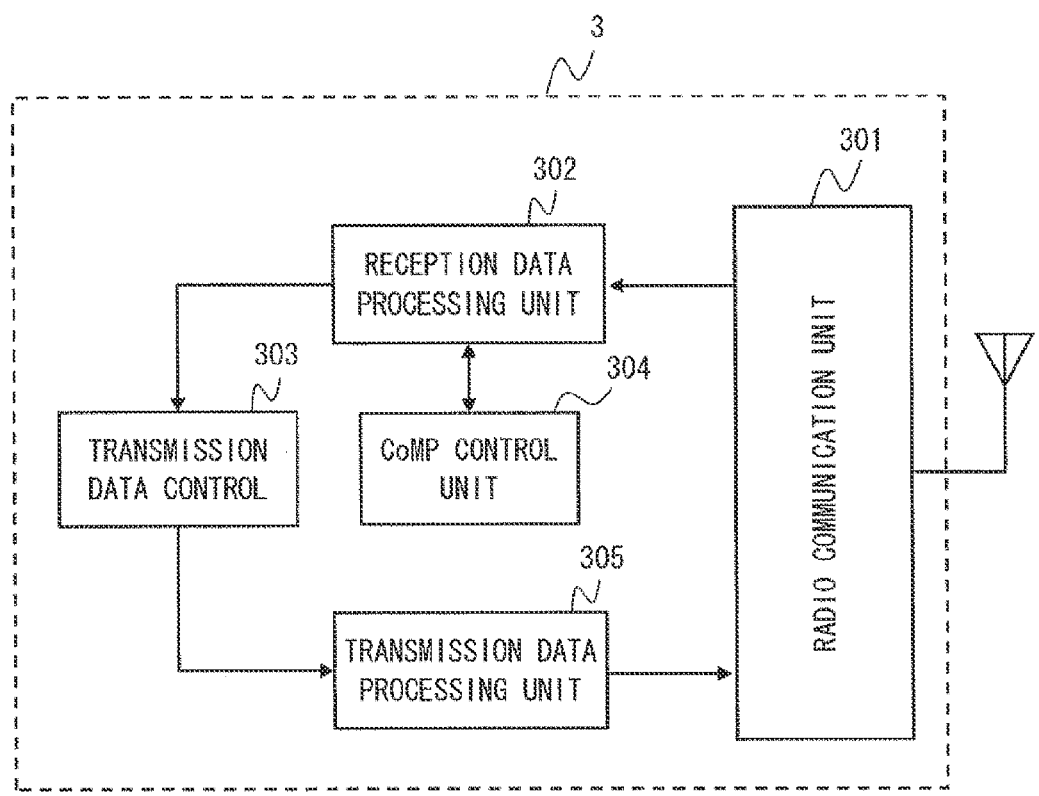
FIG. 6 is a block diagram showing a configuration example of a UE 3 shown in FIG. 3.

FIG. 6 is a block diagram showing a configuration example of the UE 3 according to the first to fourth embodiments. The UE 3 includes, for radio communication with the Serving eNB 1 and the CoMP eNB 2, a radio communication unit 301, a reception data processing unit 302, a transmission data control unit 303, a CoMP control unit 304, and a transmission data processing unit 305. The reception data processing unit 302 receives data from the Serving eNB 1, and when the data is the CoMP configuration information, transmits the data to the CoMP control unit 304. Further, the reception data processing unit 302 receives data from CoMP eNB 2 based on the CoMP configuration instructed from the CoMP control unit 304.

Figure 7:
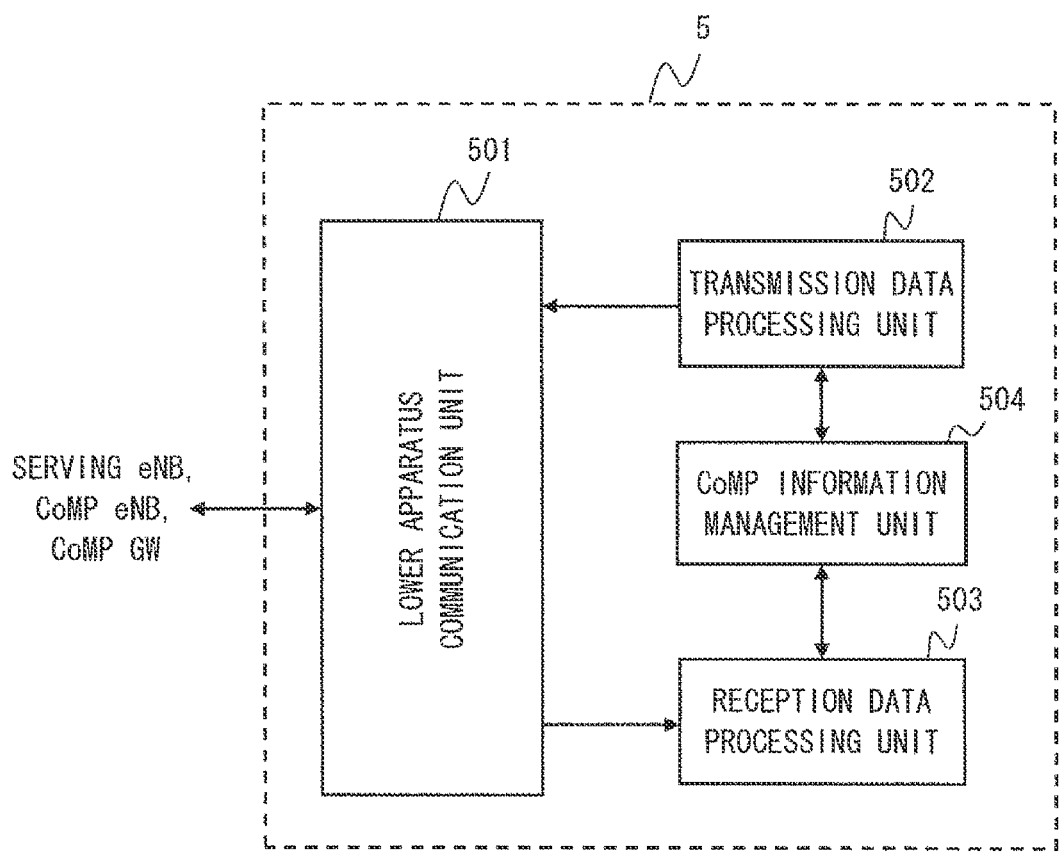
FIG. 7 is a block diagram showing a configuration example of an MME 5 shown in FIG. 3.

FIG. 7 is a block diagram showing a configuration example of the MME 5 according to the first to fourth embodiments. The MME 5 includes a lower apparatus communication unit 501, a transmission data processing unit 502, a reception data control unit 503, and a CoMP information management unit 504. The lower apparatus 501 communicates with the Serving eNB 1, the CoMP eNB 2, and the CoMP GW 7. The reception data processing unit 503 receives the data from the Serving eNB 1, the CoMP eNB 2, or the CoMP GW 7, and when it is a CoMP setup request, forwards it to the CoMP information management unit 504. Upon a request for establishing CoMP, the CoMP information management unit 504 generates the CoMP configuration information and transmits the CoMP configuration information to the UE 3 through the transmission data processing unit 502 and the lower apparatus communication unit 601.

Figure 8:
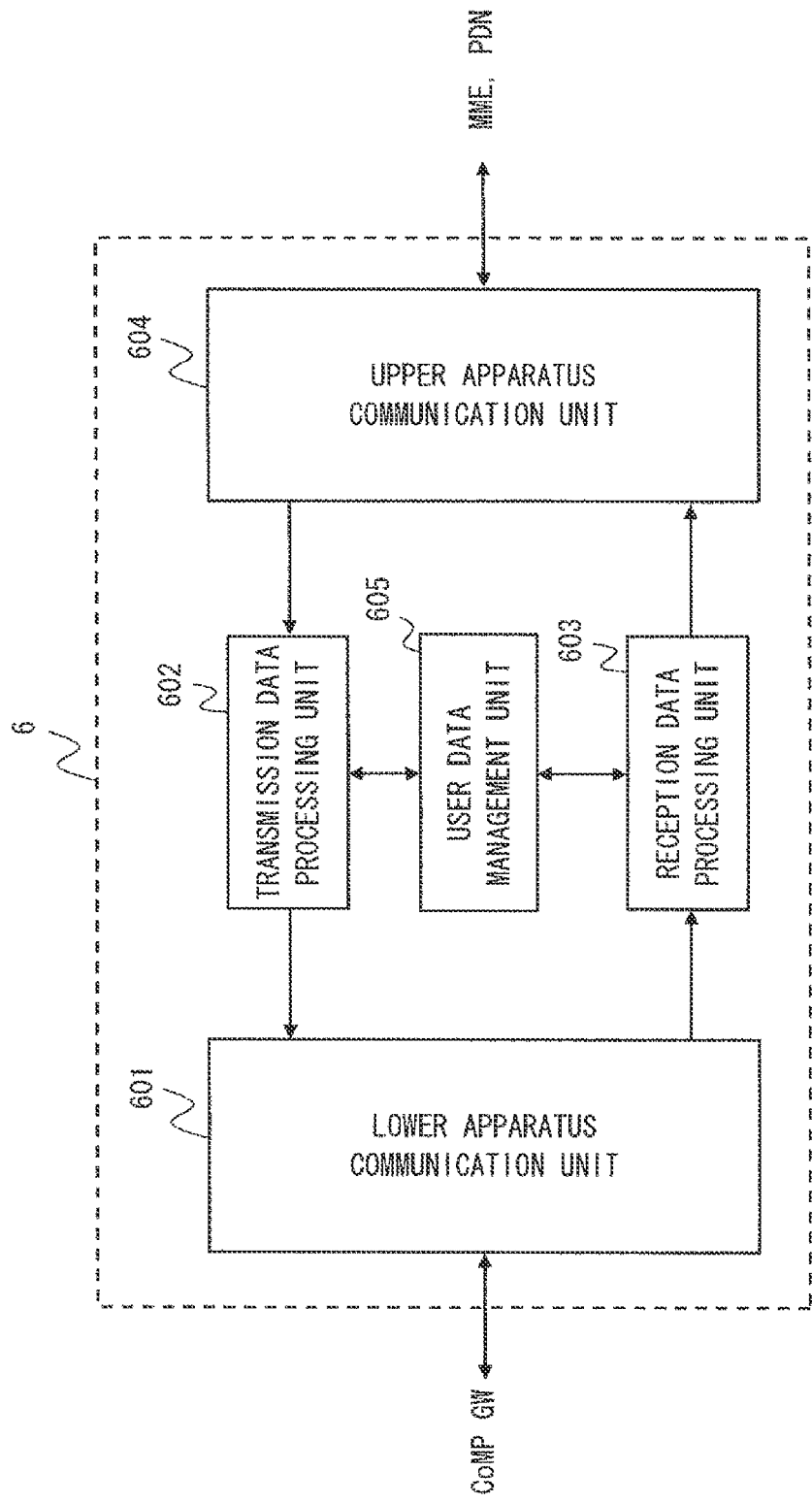
FIG. 8 is a block diagram showing a configuration example of an S/P-GW 6 shown in FIG. 3.

FIG. 8 is a block diagram showing a configuration example of the S/P-GW 6 according to the first to fourth embodiments. The S/P-GW 6 includes a lower apparatus communication unit 601, a transmission data processing unit 602, a reception data control unit 603, an upper apparatus communication unit 604, and a user data management unit 605. The lower apparatus communication unit 601 communicates with the Serving eNB 1, the CoMP eNB 2, and the CoMP GW 7. The upper apparatus communication unit 603 communicates with the MME 5 and a Packet Data Network (PDN). The reception data processing unit 603 receives the data transmitted from the Serving eNB 1, the CoMP eNB 2, or the CoMP GW 7. The user data management unit 605 holds the user data control information notified from the MME 5. The transmission data processing unit 602 establishes a communication path (i.e., S1 bearer) for transmitting the user data to the Serving eNB 1 through the CoMP GW 7 based on the user data control information and transmits the user data using the communication path.

In the case of LTE Advanced, the user data control information notified to the S/P-GW 6 from the MME 5 includes configuration information of the EPS bearer between the UE 3 and the S/P-GW 6. To state more specifically, the user data control information notified to the S/P-GW 6 from the MME 5 includes an IMSI (International Mobile Subscriber Identity) of the UE 3, the IP address of the UE 3, an address of a P-GW, a wireless access type, bearer QoS information (QCI (QoS Class Identifier)), and the like, regarding a default bearer or an dedicated bearer that should be established. The MME 5 signals the user data control information to the S/P-GW 6 using a control plane interface (i.e., S11 interface) between the MME 5 and the S/P-GW 6.

Figure 9:
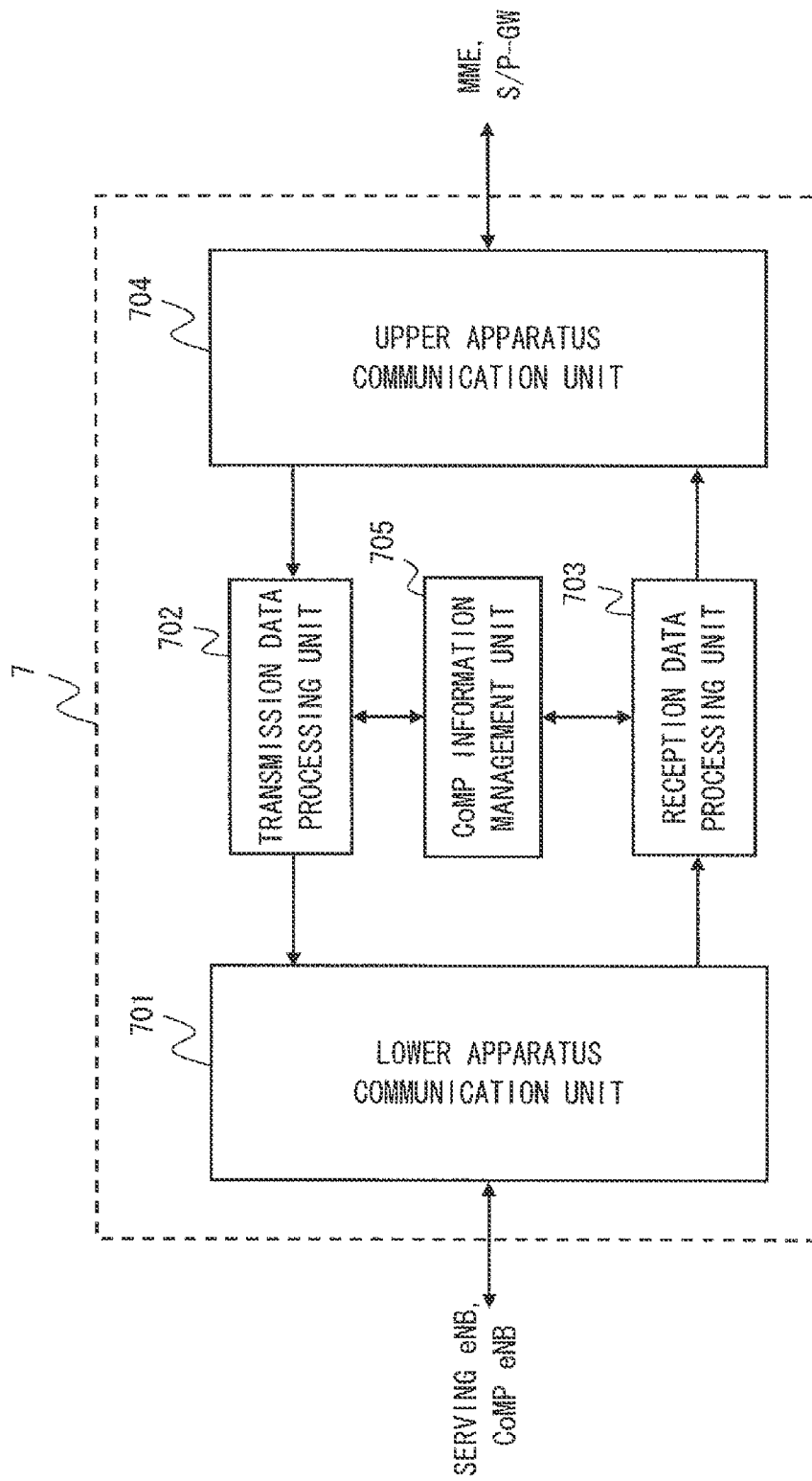
FIG. 9 is a block diagram showing a configuration example of a CoMP GW 7 shown in FIG. 3.

FIG. 9 is a block diagram showing a configuration example of the CoMP GW 7 according to the first to fourth embodiments. The CoMP GW 7 includes a lower apparatus communication unit 701, a transmission data processing unit 702, a reception data control unit 703, an upper apparatus communication unit 704, and a CoMP information management unit 705. The lower apparatus communication unit 701 communicates with the Serving eNB 1 and the CoMP eNB 2. The upper apparatus communication unit 704 communicates with the MME 5 and the S/P-GW 6. The CoMP control unit 705 holds the CoMP configuration information notified from the MME 5. The CoMP control unit 705 sets up, in accordance with the CoMP configuration information, a communication path (i.e., bearer for CoMP) for transmitting to the CoMP eNB 2 the user data based on the user data addressed to the Serving eNB 1. The CoMP control unit 705 transmits the user data to the CoMP eNB 2 through the transmission data processing unit 702 and the lower apparatus communication unit 701 using the communication path.

In the case of LTE Advanced, the CoMP configuration information notified to the CoMP GW 7 from the MME 5 includes configuration information of the bearer between the UE 3 and the CoMP GW 7. To state more specifically, the CoMP configuration information notified from the MME 5 to the CoMP GW 7 includes the IMSI (International Mobile Subscriber Identity) of the UE 3, the IP address of the UE 3, the address of the P-GW, the wireless access type, the bearer QoS information (QCI (QoS Class Identifier)), and the like. For example, the MME 5 may signal the CoMP configuration information to the CoMP GW 7 using a control plane interface between the MME 5 and the CoMP GW.

The CoMP GW 7 may monitor the user data control information notified from the MME 5 to the Serving eNB 1 and use the obtained user data control information as the CoMP configuration information. In this case, the CoMP GW 7 may monitor the user data control information while terminating the control plane interface (S1-MME interface) between the MME 5 and the Serving eNB 1 and relaying control plane information between the MME 5 and the Serving eNB 1. Further, the CoMP GW 7 may monitor the user data control information notified to the S/P-GW 6 from the MME 5 and use the obtained user data control information as the CoMP configuration information. In this case, the CoMP GW 7 may monitor the user data control information while terminating the control plane interface between the MME 5 and the S/P-GW 6 (S11 interface) and relaying the control plane information between the MME 5 and the S/P-GW 6.

First Embodiment

This embodiment illustrates an example in which the CoMP GW 7 relays only the user data from the S/P-GW 6, and both of the Serving eNB 1 and the CoMP eNB 2 transmit the user data to the UE 3. That is, in this embodiment, signaling regarding the CoMP configuration is performed between each of the Serving eNB 1 and the CoMP eNB 2 and the MME 5.

Figure 10:
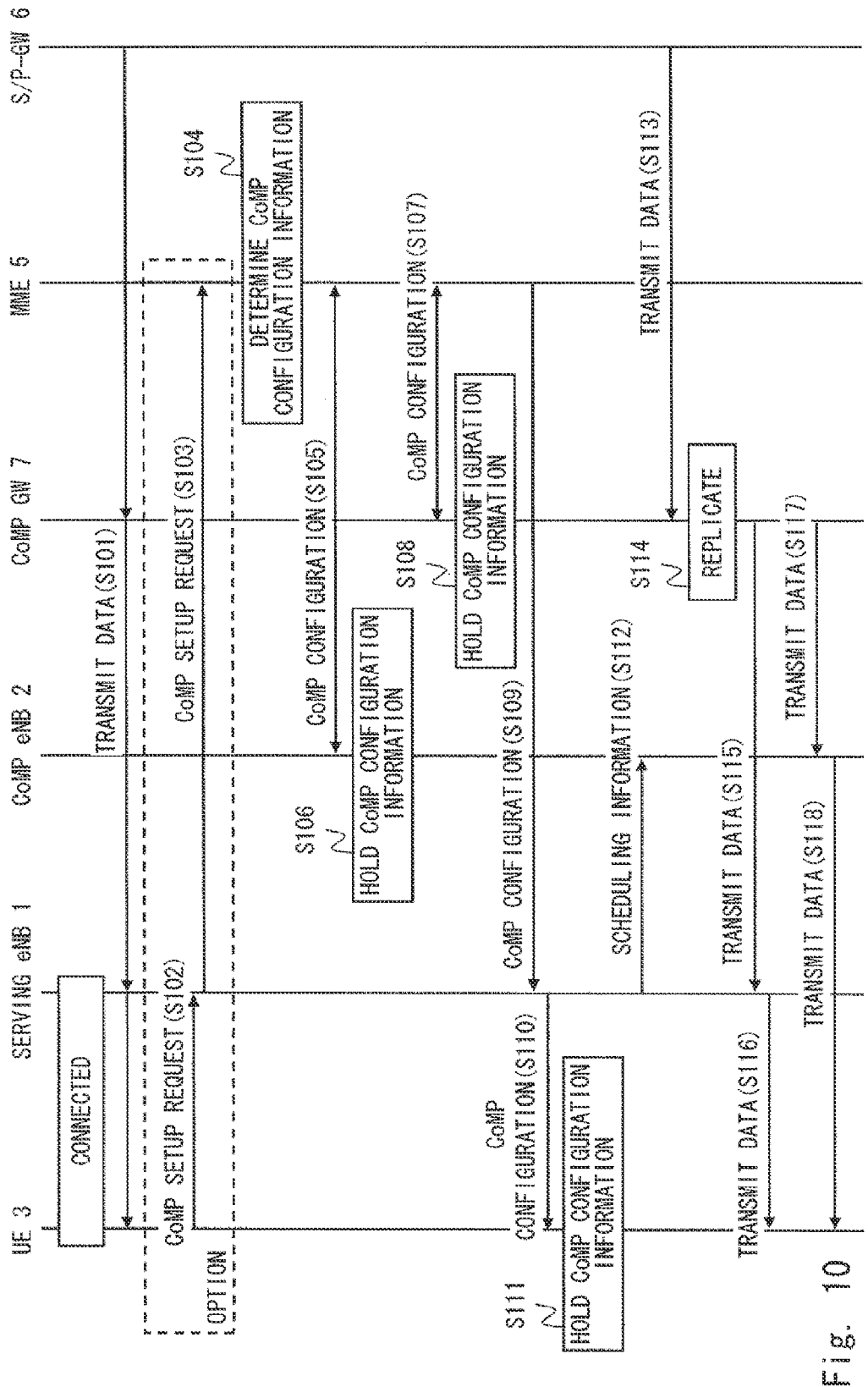
FIG. 10 is a sequence diagram according to a first embodiment.
Figure 11:
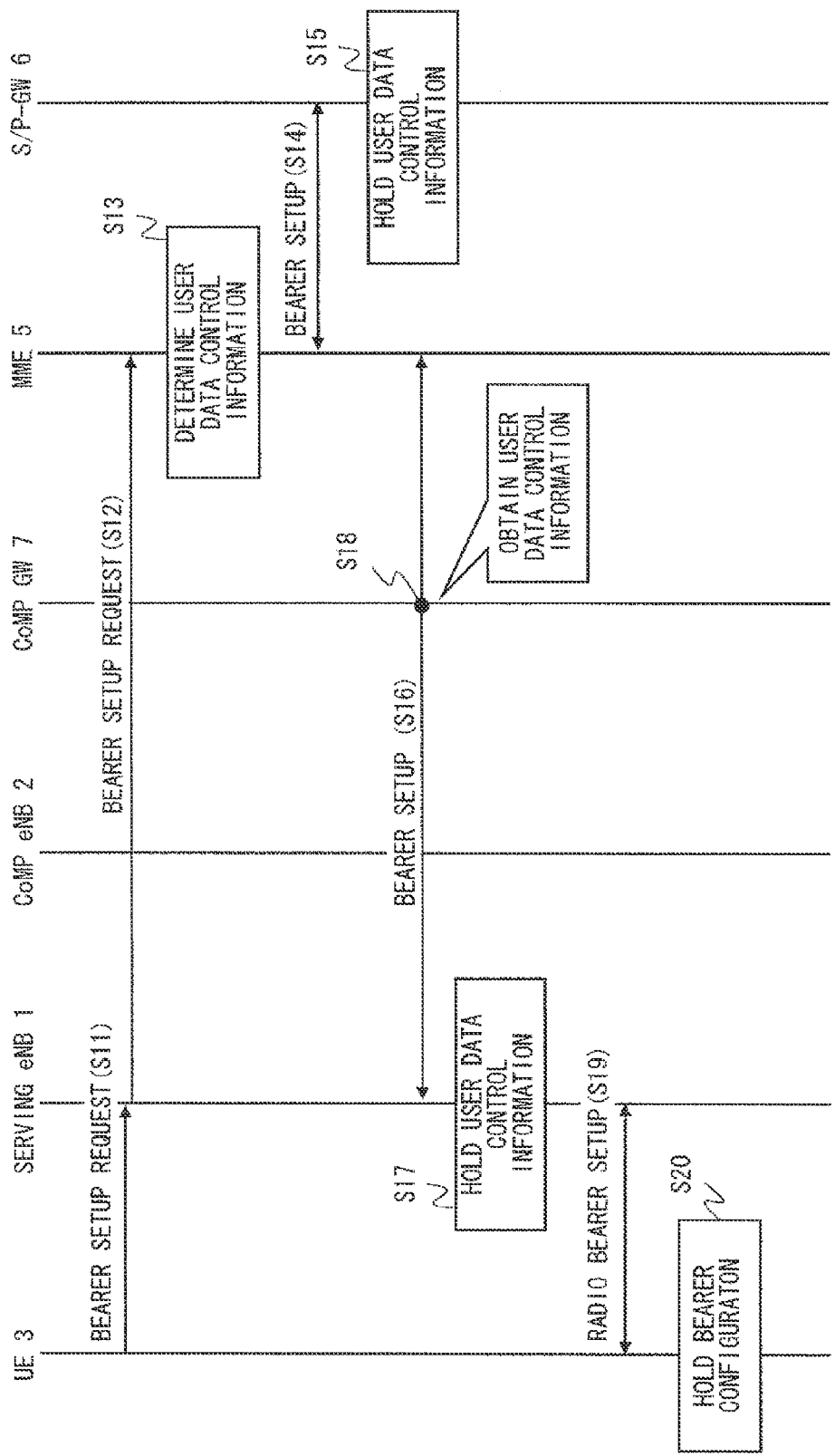
FIG. 11 is a sequence diagram showing dedicated bearer setup according to the first embodiment.

FIG. 10 is a sequence diagram showing a CoMP configuration procedure according to this embodiment. Firstly in the step S100, a default bearer or a dedicated bearer between the UE 3 and the S/P-GW 6 is established. This bearer setup procedure may be similar to an EPS bearer setup procedure that is mainly performed by the MME 5. A specific example of the bearer setup procedure in the step S100 is explained according to the sequence in FIG. 11. In the steps S11 and S12, the UE 3 transmits a bearer setup request (e.g., attach request in the case of the default bearer) to the MME 5 using a control bearer (e.g., Signaling Radio Bearer) between the Serving eNB 1. In the step S13, the MME 5 determines the user data control information necessary for the bearer setup. In the step S14, the MME 5 requests the S/P-GW 6 to set up the bearer using the determined user data control information. In the step S15, the S/P-GW 6 holds the user data control information notified from the MME 5, and sets up the bearer for transmitting the user data to the UE 3. In the step S16, the MME 5 requests the Serving eNB 1 to set up the bearer using the determined user data control information. In the step S17, the Serving eNB 1 holds the user data control information notified from the MME 5, and establishes the bearer for receiving the user data from the S/P-GW 6. The CoMP GW 7 monitors the signaling for the bearer setup between the Serving eNB 1 and the MME 5 and obtains the user data control information signaled to the Serving eNB 1 from the MME 5 (step S18). The user data control information obtained in the step S18 is used as the CoMP configuration information. In the step S19, the Serving eNB 1 establishes a radio bearer between the UE 3 according to the user data control information notified from the MME 5. In the step S20, the UE 4 holds the radio bearer configuration.

Returning to FIG. 10, the explanation will be continued. The user data is transmitted to the UE 3 from the S/P-GW 6 through the Serving eNB 1 (step S101). When the UE 3 wishes to start CoMP, the UE 3 transmits the CoMP setup request to the Serving eNB (step S102). The Serving eNB 1 transmits the CoMP setup request received from the UE 3 to the MME 5 (step S103). Upon a receipt of the CoMP setup request, the MME 5 determines the CoMP configuration information (step S104) and transmits the CoMP configuration information to the corresponding COMP eNB 2 (step S105). At this time, the CoMP eNB 2 holds the CoMP configuration information (step S106). The MME 5 transmits the CoMP configuration information also to the CoMP GW 7 (step S107), and the CoMP GW 7 holds the CoMP configuration information (step S108). Furthermore, the MME 5 transmits the CoMP configuration information to the Serving eNB 1 (step S109). The Serving eNB 1 transmits the received CoMP configuration information to the UE 3 (step S110). The UE 3 holds the received CoMP configuration information (step S111). Execution through the step S111 completes the CoMP setup.

The Serving eNB 1 notifies the CoMP eNB 2 of the scheduling information including information about the transmission timing of the user data and the resource block to be used via the X2 interface or the S1 interface at a predetermined timing (step S112). When there is the user data that should be transmitted to the UE 3, the S/P-GW 6 transmits this to the CoMP GW 7 (step S113). The CoMP GW 7 replicates the received user data (step S114) and transmits it to the Serving eNB 1 and the CoMP eNB 2 based on the CoMP configuration information (step S115 and step S117). The Serving eNB 1 and the CoMP eNB 2 transmit the user data to the UE 3 based on the scheduling information (step S116 and step S118).

Figure 12:
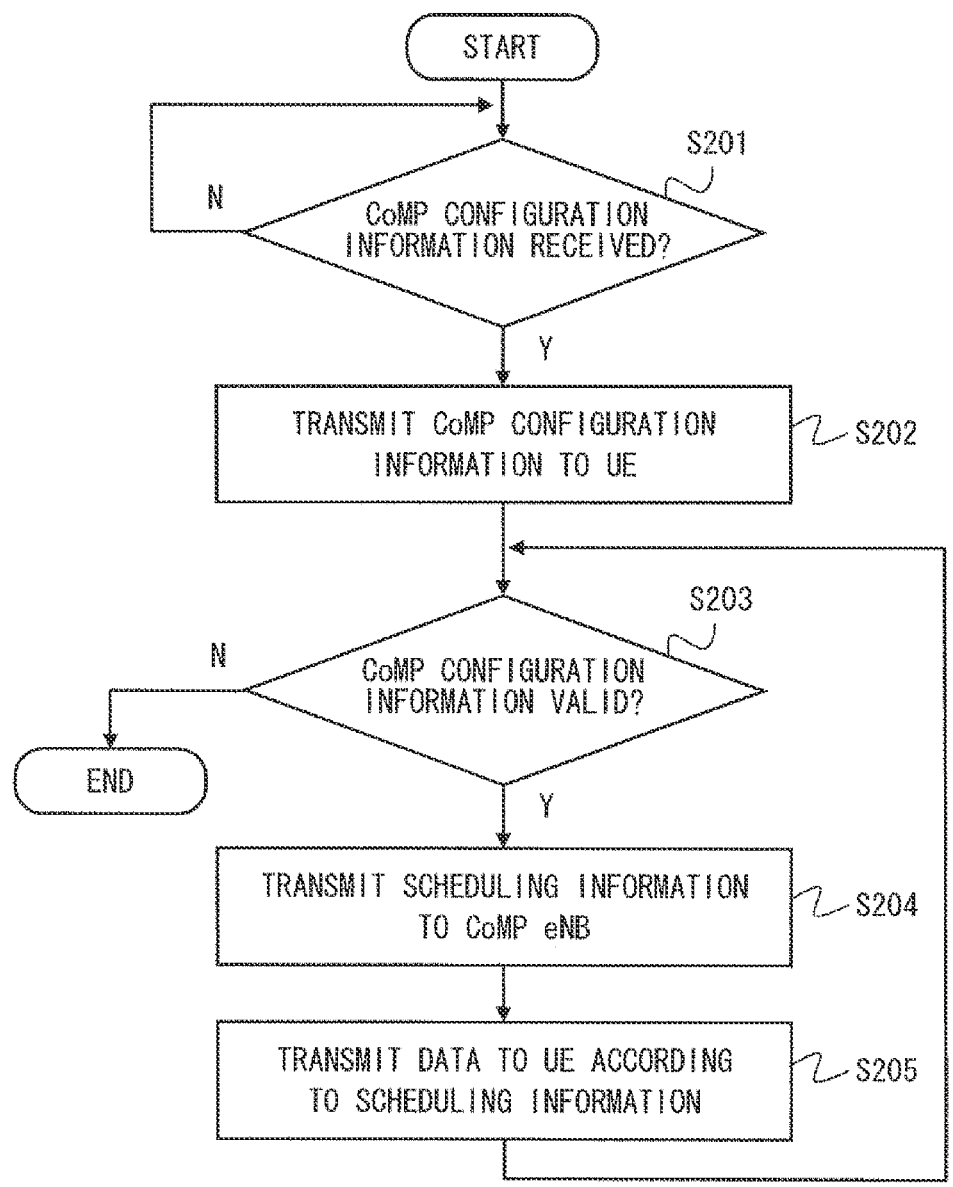
FIG. 12 is a flowchart showing an operation of a Serving eNB according to the first embodiment.

FIG. 12 is a flowchart showing an example of the CoMP setup operation in the Serving eNB 1. The Serving eNB 1 starts the operation of FIG. 12 in response to a receipt of the CoMP configuration information from the MME 5 (step S201). Upon not receiving the CoMP configuration information from the MME 5 (N in the step S201), the Serving eNB 1 returns to the step S201. Upon receiving the CoMP configuration information from the MME 5 (Y in the step S201), the Serving eNB 1 holds the CoMP configuration information, transmits the CoMP configuration information to the UE 3 (step S202), and moves to an operation of evaluating whether the CoMP configuration information is valid (step S203). When the CoMP configuration information is not valid (N in the step S203), the Serving eNB 1 ends the CoMP operation. When the CoMP configuration information is valid (Y in the step S203), the Serving eNB 1 transmits the scheduling information to the CoMP eNB 2 at a predetermined timing (step S204) and transmits the user data to the UE 3 based on the scheduling information (step S205). After that, the Serving eNB 1 returns to the operation of evaluating whether the CoMP configuration information is valid (step S203).

Although in the example of FIG. 12, the Serving eNB 1 transmits the scheduling information to the CoMP eNB 2 before the transmission of the user data (step S204), in the case for example where the scheduling information is used semi-fixedly, the Serving eNB 1 does not need to transmit the scheduling information to the CoMP eNB 2.

Figure 13:
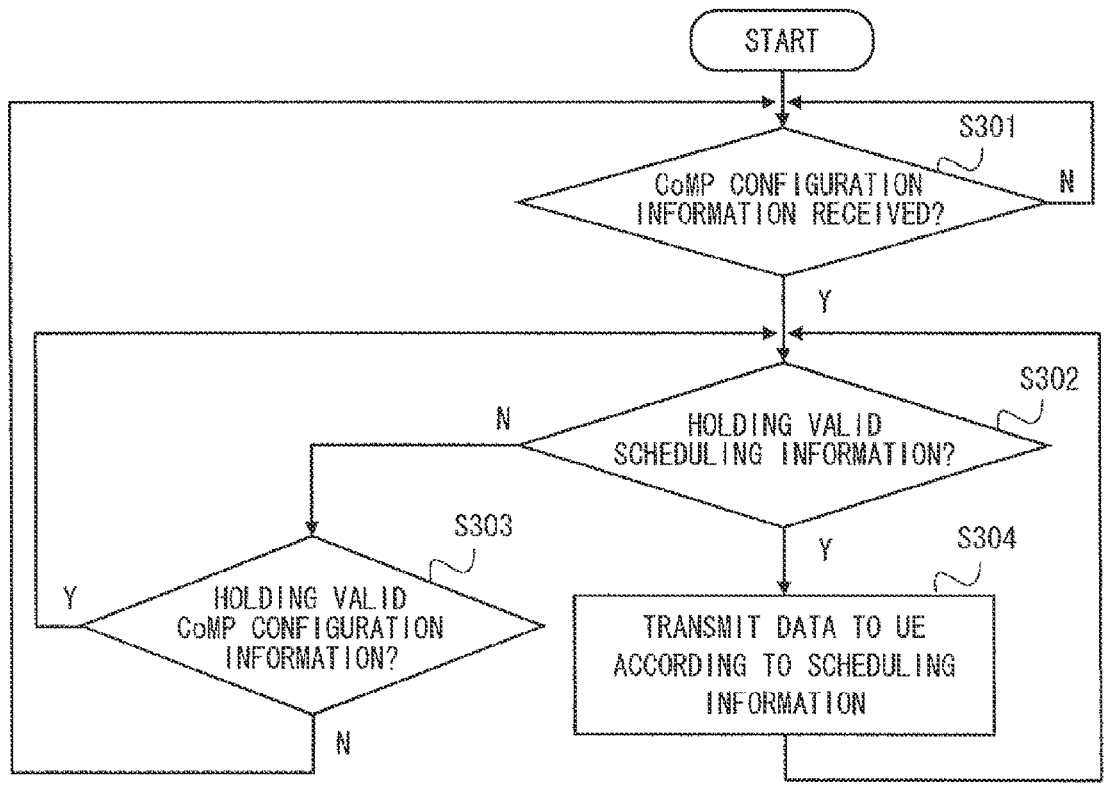
FIG. 13 is a flowchart showing an operation of a CoMP eNB according to the first embodiment.

FIG. 13 is a flowchart showing an example of the CoMP configuration operation in the CoMP eNB 2. The CoMP eNB 2 starts the operation of the FIG. 13 in response to a receipt of the CoMP configuration information from the MME 5 (step S301). Upon not receiving the CoMP configuration information from the MME 5 in the step S301 (N in the step S301), the CoMP eNB 2 returns to the step S301. Upon receiving the CoMP configuration information from the MME 5 (Y in the step S301), the CoMP eNB 2 holds the CoMP configuration information and moves to an operation of evaluating whether valid scheduling information is held (step S302). When the valid scheduling information is not held (N in the step S302), the CoMP eNB 2 moves to an operation of evaluating whether the CoMP configuration information is valid (step S303). When the CoMP configuration information is valid (Y in the step S203), the CoMP eNB 2 returns to the operation of evaluating whether the valid scheduling information is held (step S302), whereas when the CoMP configuration information is not valid (N in the step S303), the CoMP eNB 2 returns to the step S301. When the valid scheduling information is held in the step S302 (Y in the step S302), the CoMP eNB 2 transmits the user data to the UE 3 based on the scheduling information (step S304) and returns to the step S302.

Figure 14:
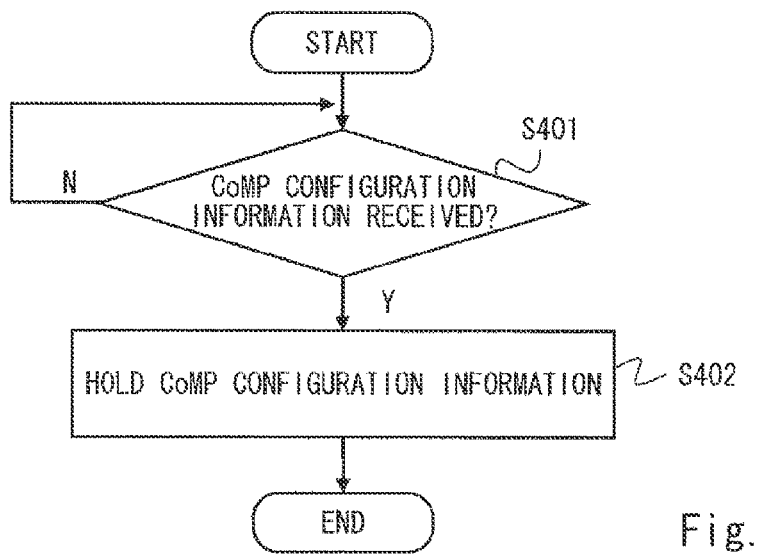
FIG. 14 is a flowchart showing an operation of a UE according to the first embodiment.

FIG. 14 is a flowchart showing an example of the CoMP setup operation in the UE 3. The UE 3 starts the operation of FIG. 14 in response to a receipt of the CoMP configuration information from the Serving eNB 1 (step S401). Upon not receiving the CoMP configuration information from the Serving eNB (N in the step S401), the UE 3 returns to the step S401. On the other hand, upon receiving the CoMP configuration information from the Serving eNB 1 (Y in the step S401), the UE 3 holds the CoMP configuration information (step S402) and ends the CoMP setup operation.

Figure 15:
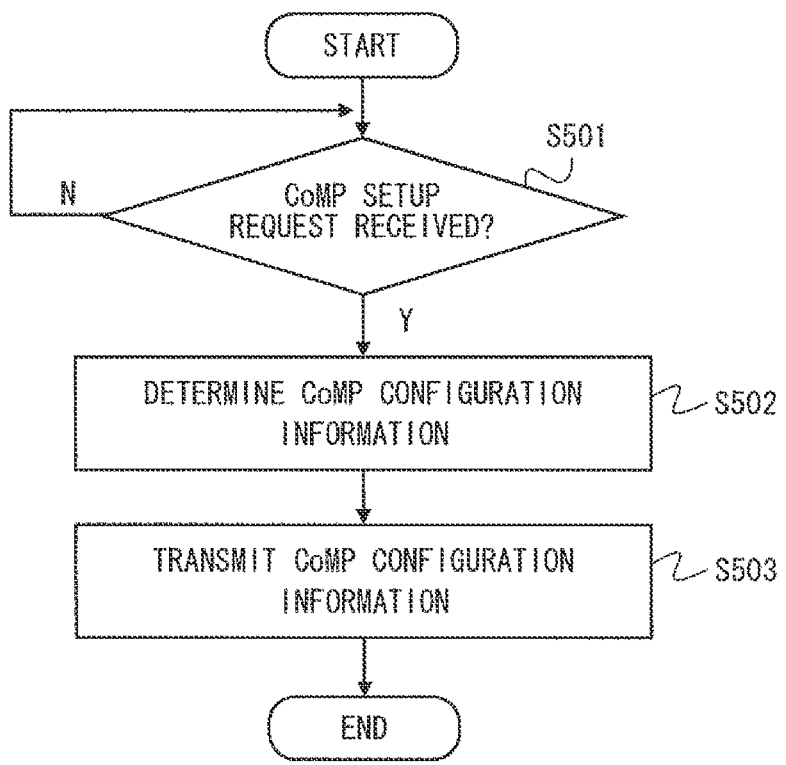
FIG. 15 is a flowchart showing an operation of an MME according to the first embodiment.

FIG. 15 is a flowchart showing an example of the CoMP setup operation in the MME 5. The MME 5 starts the operation of the FIG. 15 in response to a receipt of the CoMP setup request from the UE 3 (step S501). Upon not receiving the CoMP setup request from the UE 3 (N in the step S501), the MME 5 returns to the step S501. On the other hand, upon receiving the CoMP setup request from the UE 3 (Y in the step S501), the MME 5 determines the CoMP configuration information (step S502), transmits the determined CoMP configuration information to the Serving eNB 1, the CoMP eNB 2, and the CoMP GW 7 (step S503), and ends the operation.

Figure 16:
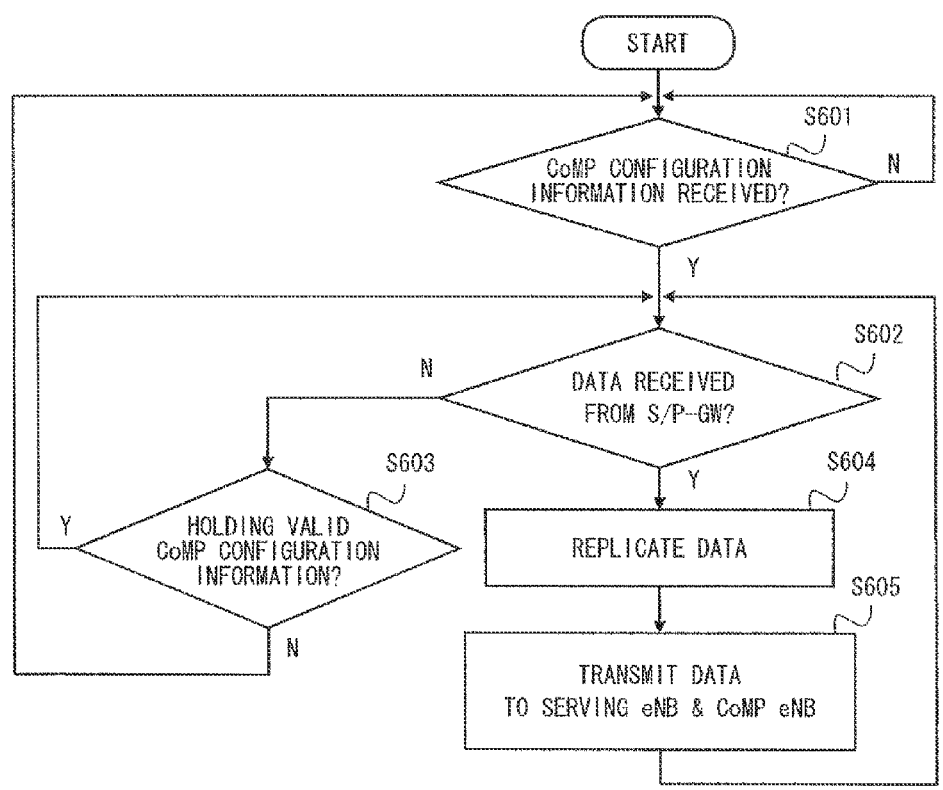
FIG. 16 is a flowchart showing an operation of a CoMP GW according to the first embodiment.

FIG. 16 is a flowchart showing an example of the CoMP setup operation in the CoMP GW 7. The CoMP GW 7 starts the operation of FIG. 16 in response to a receipt of the CoMP configuration information from the MME (step S601). Upon not receiving the CoMP configuration information from the MME 5 (N in the step S601), the CoMP GW 7 returns to the step S601. On the other hand, upon receiving the CoMP configuration information from the MME 5 (Y in the step S601), the CoMP GW 7 moves to an operation of evaluating whether the user data is received from the S/P-GW 6 (step S602). Upon not receiving the user data from the S/P-GW (N in the step S602), the CoMP GW 7 moves to an operation of evaluating whether the CoMP configuration information is valid (step S603). When the CoMP configuration information is valid in the step S603 (Y in the step S603), the CoMP GW 7 returns to the operation of evaluating whether the user data is received from the S/P-GW (step S602), whereas when the CoMP configuration information is not valid (N in the step S603), the CoMP GW 7 returns to the step S601. Upon receiving the user data from the S/P-GW in the step S602 (Y in the step S603), the CoMP GW 7 replicates the user data (step S604), transmits the user data to the Serving eNB 1 and the CoMP eNB 2 (step S605), and returns to the step S602.

Since the operation of S/P-GW 6 is similar to a normal operation of the S/P-GW, the explanation is omitted. In this embodiment, the CoMP GW 7 replicates the user data transmitted from the S/P-GW 6 and transmits it to the Serving eNB 1 and the CoMP eNB 2. This reduces the influence on the operation of the S/P-GW 6 when Inter-eNB CoMP is performed. Moreover, supplying the user data to the Serving eNB 1 and the CoMP eNB 2 through the common CoMP GW 7 enables a reduction in the delay difference between the user data reaching the Serving eNB 1 and the CoMP eNB 2.

Note that the function of the CoMP GW 7 may be realized as a part of the core network 4 such as the S/P-GW 6. In other words, the function block that realizes the function of the CoMP GW 7 and other function blocks of the core network 4, such as the S/P-GW 6, may be integrally disposed on one apparatus. Even in this case, the function block of the CoMP GW 7 can exist independently from the function block of the S/P-GW 6. This minimizes the impact of the specification change on the node composing the existing core network.

In addition, the case where the function of the CoMP GW 7 is realized as a part of the Serving eNB 1, in other words, the case where the function block realizing the function of the CoMP GW 7 and the function of the Serving eNB 1 are integrally disposed on one apparatus, is considered. When the user data is forwarded to the CoMP eNB 2 using the original function of the Serving eNB 1, the Serving eNB 1 has to terminate an S1 layer regarding the user data transmitted from the S/P GW, and to transfer the terminated user data using the X2 interface. On the other hand, when the function of the CoMP GW 7 is realized as a part of the Serving eNB 1, the Serving eNB 1 can perform transmission to the CoMP eNB 2 only by replacing the IP address using a proxy function, which is the function of the CoMP GW 7. Therefore, it is possible to reduce the delay difference between the data reaching the Serving eNB 1 and the CoMP eNB 2 more than forwarding using the original function of the Serving eNB 1.

Second Embodiment

This embodiment illustrates an example in which the CoMP GW 7 relays the user data from the S/P-GW 6 and the control data from the MME 5, and both of the Serving eNB 1 and the CoMP eNB 2 transmit the user data to the UE 3.

Figure 17:
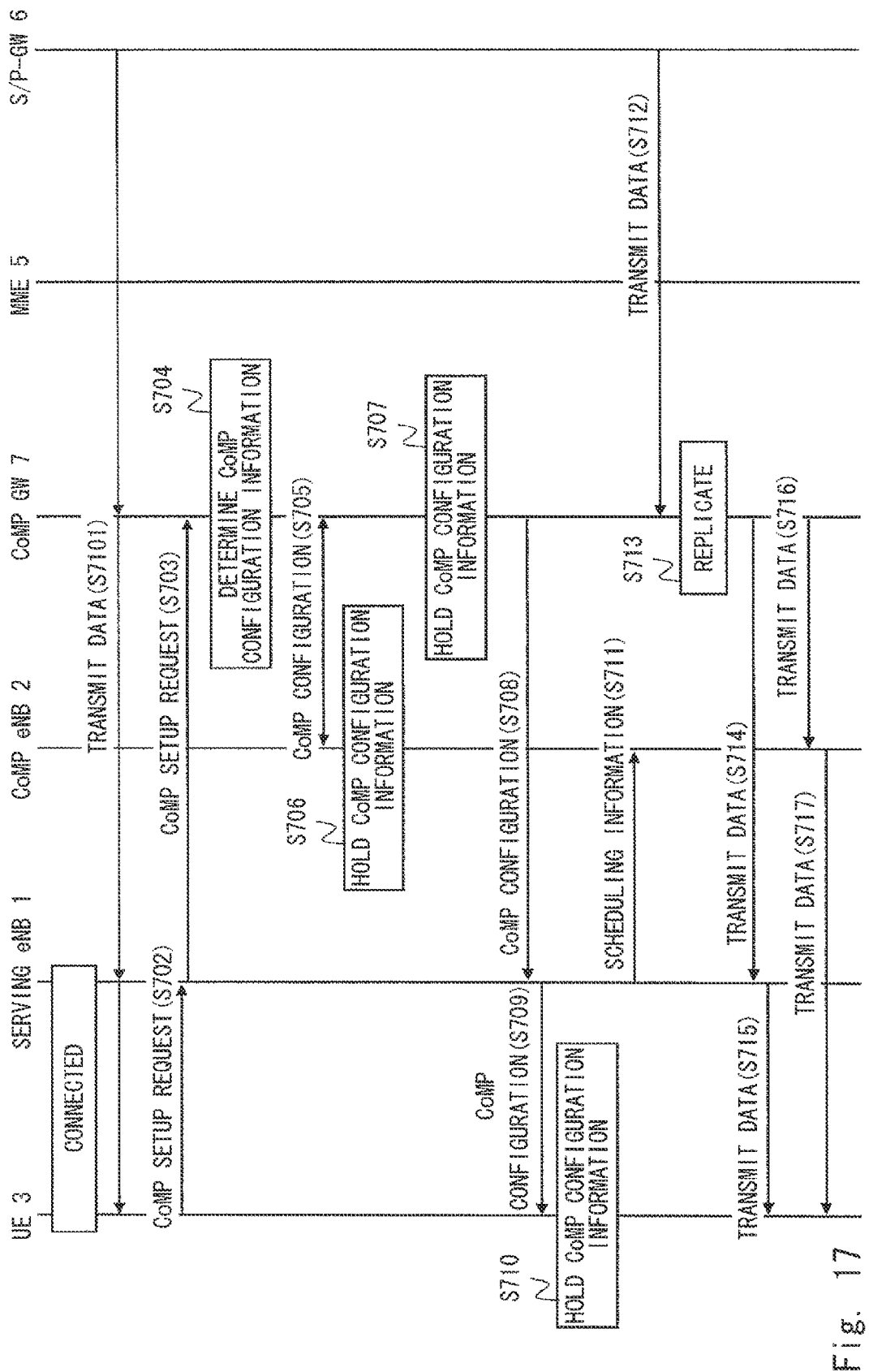
FIG. 17 is a sequence diagram according to a second embodiment.

FIG. 17 is a sequence diagram showing a CoMP setup procedure according to this embodiment. The UE 3 is connected to the Serving eNB 1. The user data is transmitted to the UE 3 from the S/P-GW 6 through the Serving eNB 1 (step S701). When the UE 3 wishes to start CoMP, the UE 3 transmits the CoMP setup request to the Serving eNB (step S702). The Serving eNB 1 transmits the CoMP setup request received from the UE 3 to the CoMP GW 7 (step S703). Upon receiving the CoMP setup request, the CoMP GW 7 determines the CoMP configuration information (step S704) and transmits the CoMP configuration information to the corresponding CoMP eNB 2 (step S705). At this time, the CoMP eNB 2 holds the CoMP configuration information (step S706). The CoMP GW 7 holds the CoMP configuration information (step S707). The CoMP GW 7 transmits the CoMP configuration information to the Serving eNB 1 (step S708). The Serving eNB 1 transmits the received CoMP configuration information to the UE 3 (step S709). The UE 3 holds the received CoMP configuration information (step S710). Execution through the step S710 completes the CoMP setup.

The Serving eNB 1 notifies the CoMP eNB 2 of the scheduling information including information about the transmission timing of the user data and the resource block to be used via the X2 interface or the S1 interface at a predetermined timing (step S711). When there is the user data that should be transmitted to the UE 3, the S/P-GW 6 transmits this to the CoMP GW 7 (step S712). The CoMP GW 7 replicates the received user data (step S713) and transmits it to the Serving eNB 1 the CoMP eNB 2 based on the CoMP configuration information (step S714 and step S716). The Serving eNB 1 and the CoMP eNB 2 transmit the user data to the UE 3 based on the scheduling information (step S715 and step S717).

Since the operations of the Serving eNB 1, the CoMP eNB 2, and the UE 3 are similar to those in the first embodiment, the explanation is omitted. Moreover, in the second embodiment, the CoMP GW 7 performs CoMP configuration to the CoMP eNB 2 instead of the MME 5. As the operation of MME 5 is similar to the background art, the explanation is omitted.

Figure 18:
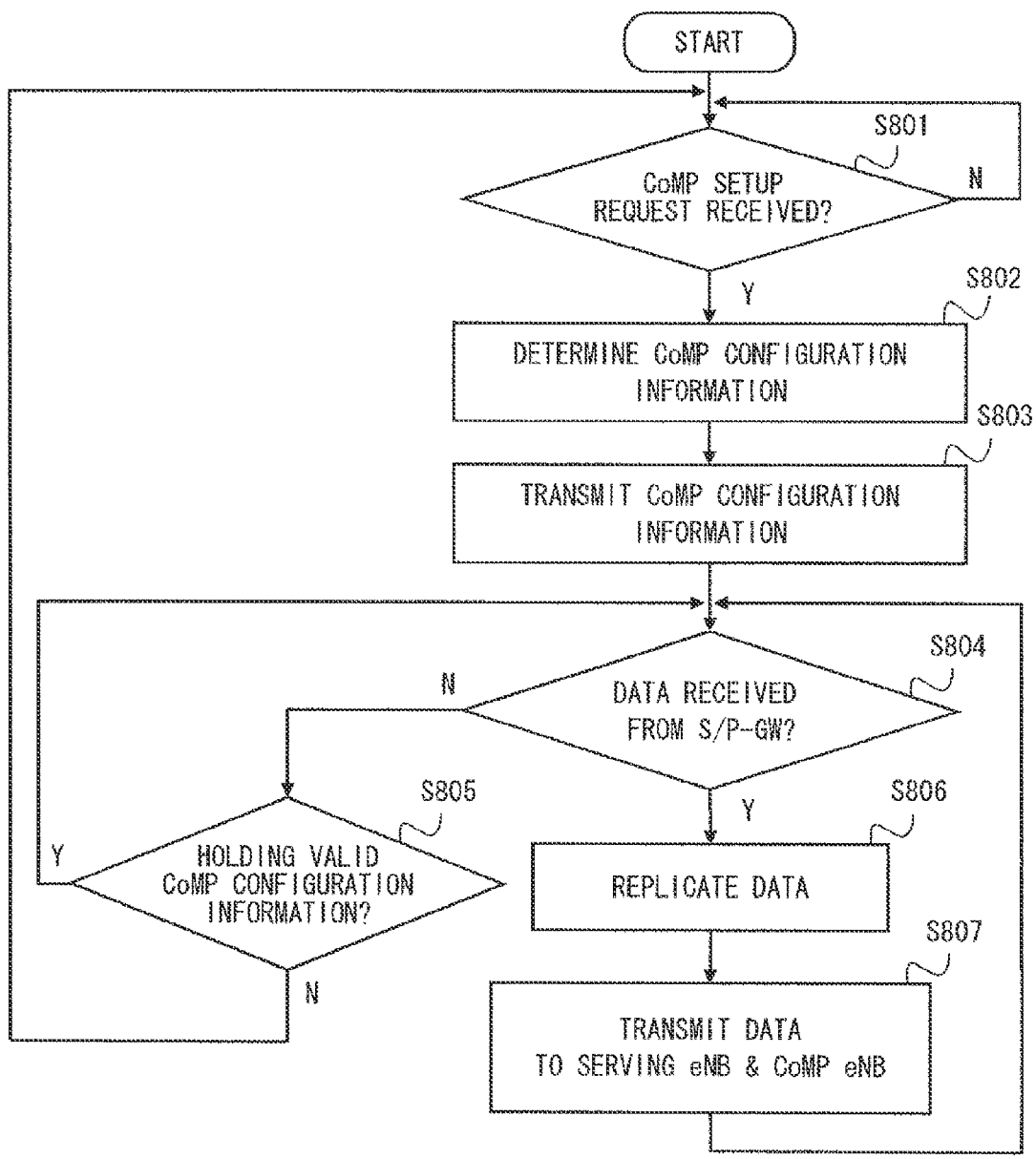
FIG. 18 is a flowchart showing an operation of a CoMP GW according to the second embodiment.

FIG. 18 is a flowchart showing an example of the CoMP setup operation in the CoMP GW 7. The CoMP GW 7 starts the operation of FIG. 18 in response to a receipt of the CoMP setup request from the UE 3 (step S801). Upon not receiving the CoMP setup request from the UE 3 (N in the step S801), the CoMP GW 7 returns to the step S801. On the other hand, upon receiving the CoMP setup request from the UE 3 (Y in the step S801), the CoMP GW 7 determines the CoMP configuration information (step S802), transmits the determined CoMP configuration information to the Serving eNB 1 and the CoMP eNB 2 (step S803), and moves to an operation of evaluating whether the user data is received from the S/P-GW 6 (step S804). Upon not receiving the user data from the S/P-GW 6 (N in the step S804), the CoMP GW 7 moves to an operation of evaluating whether the CoMP configuration information is valid (step S805). When the CoMP configuration information is valid (Y in the step S805), the CoMP GW 7 returns to the operation of evaluating whether the user data is received from the S/P-GW 6 (step S804). On the other hand, when the CoMP configuration information is not valid (N in the step S805), the CoMP GW 7 return to the step S801. Upon receiving the user data from the S/P-GW 6 in the step S804 (Y in the step S804), the CoMP GW 7 replicates the user data (step S806), transmits the user data to the Serving eNB and the CoMP eNB (step S807), and returns to the step S804.

In this embodiment, in a similar manner as the first embodiment, the CoMP GW 7 replicates the user data transmitted from the S/P-GW 6 and transmits it to the Serving eNB 1 and the CoMP eNB 2. Further, in this embodiment, the CoMP GW 7 obtains the user data control information signaled to the Serving eNB 1 from the MME 5 or the user data control information signaled to the S/P-GW 6 from the MME 5. Then, the CoMP GW 7 controls the CoMP configuration of the CoMP eNB 2 instead of the MME 5. This reduces the influence on the operation of the S/P-GW 6 and the MME 5 when Inter-eNB CoMP is performed. Moreover, supplying the user data to the Serving eNB 1 and the CoMP eNB 2 through the common CoMP GW 7 enables a reduction in the delay difference between the user data reaching the Serving eNB 1 and the CoMP eNB 2. Note that in a similar manner as mentioned in the first embodiment, the function block of the CoMP GW 7 as a logical node or the function block that executes the function may be disposed at the node (such as S/P-GW 6) inside the core network 4 or on the Serving eNB 1.

Third Embodiment

This embodiment illustrates an example in which the CoMP GW 7 relays only the user data from the S/P-GW 6 in a similar manner as the first embodiment. Further, this embodiment illustrates an example of transmitting the user data to the UE 3 when the CoMP eNB 2 satisfies a predetermined condition.

Figure 19:
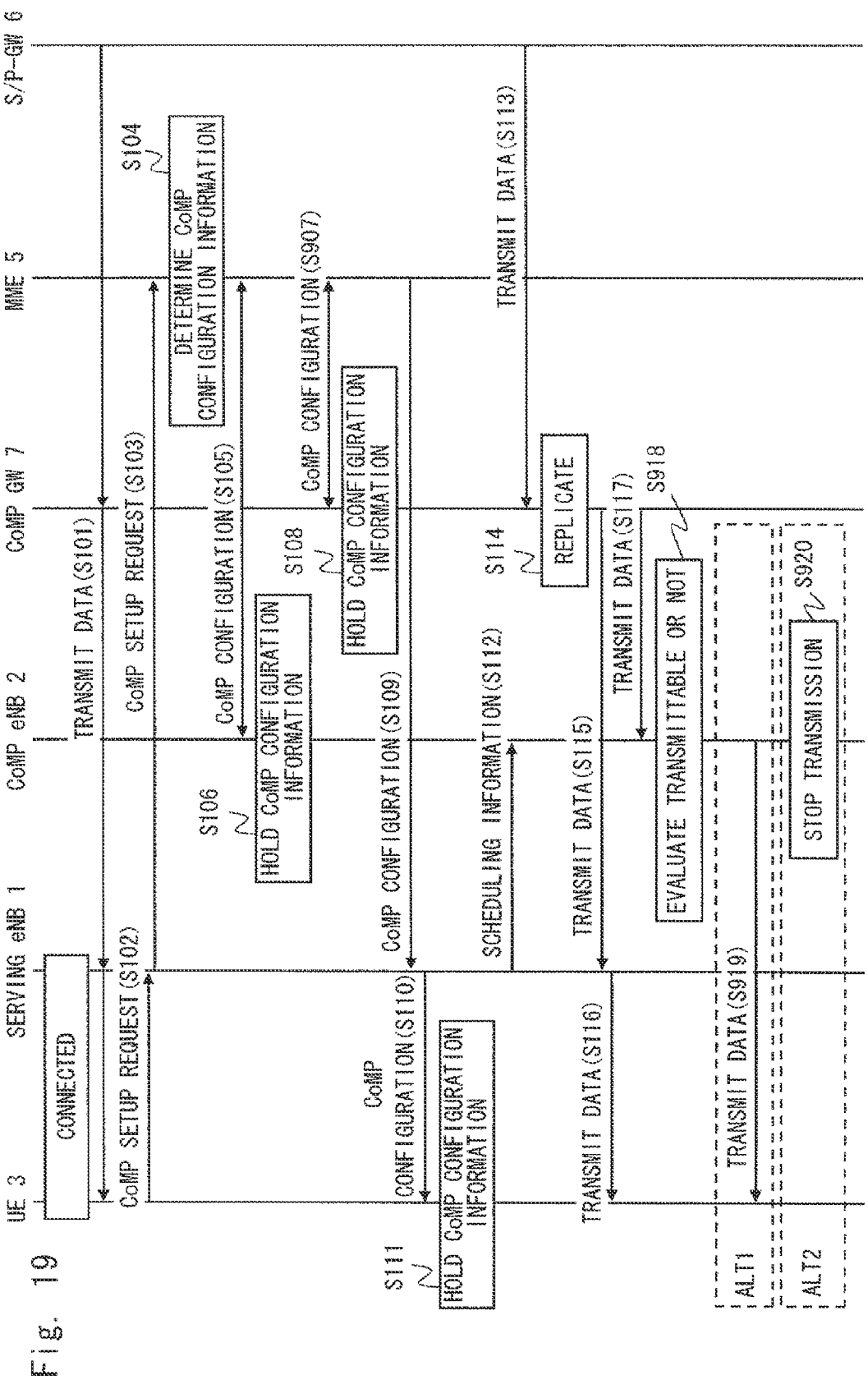
FIG. 19 is a sequence diagram according to a third embodiment.

FIG. 19 is a sequence diagram showing a CoMP configuration procedure according to this embodiment. Since the steps S101 to S117 are similar to those in the first embodiment, the explanation is omitted. The CoMP eNB 2, which received the user data from the CoMP GW 7 at the step S117, evaluates whether the transmission to the UE 3 is possible (step S918). When the transmission to the UE 3 is possible, the CoMP eNB 2 transmits the user data to the UE 3 (step S919), whereas when the transmission to the UE 3 is not possible, the CoMP eNB 2 stops the transmission to the UE 3 (step S920).

Figure 20:
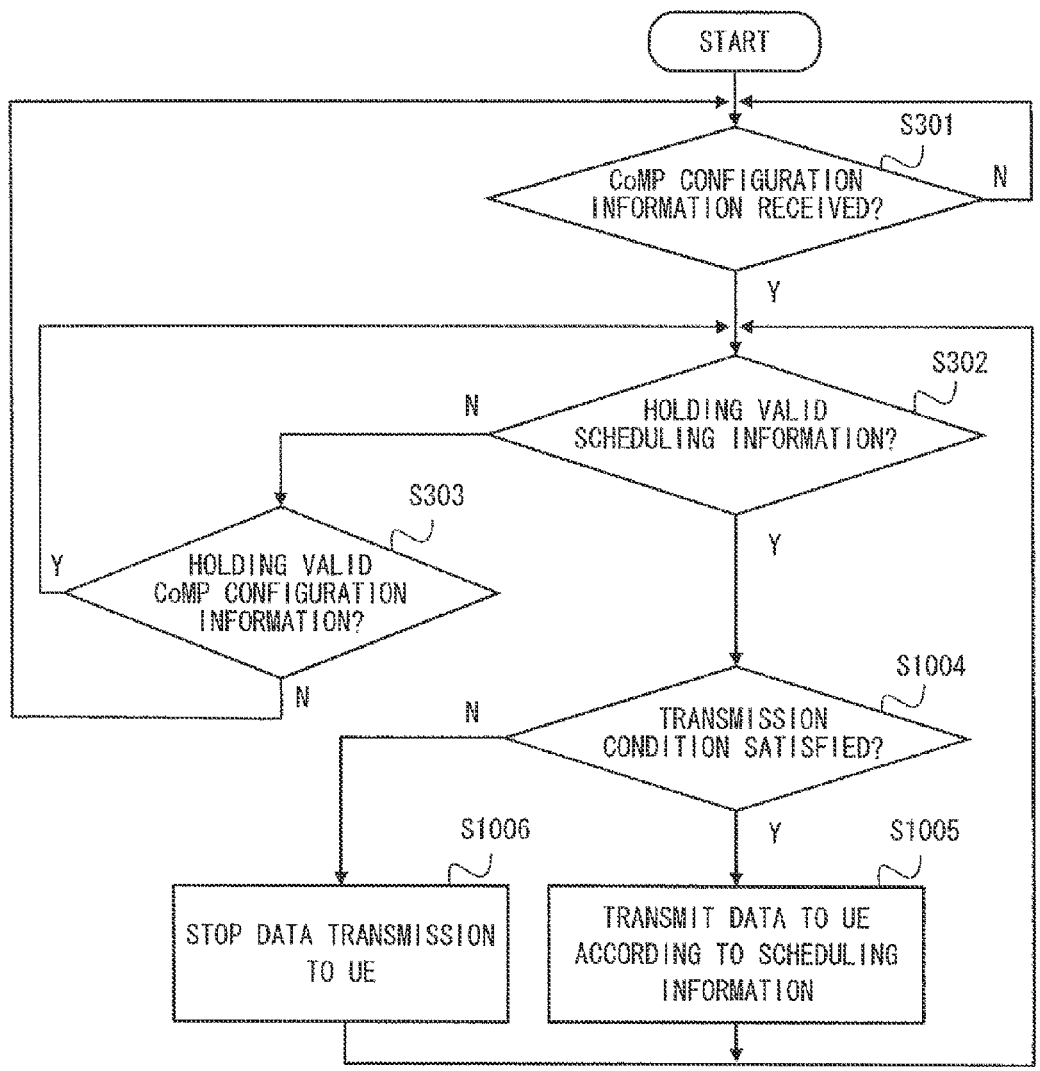
FIG. 20 is a flowchart showing an operation of a CoMP eNB according to the third embodiment.

Since the operations of the Serving eNB, the UE, the MME, and the CoMP GW are similar to those in the first embodiment, the explanation is omitted. FIG. 20 is a flowchart showing an example of the CoMP setup operation in the CoMP eNB 2. As the steps S301 to S303 are similar to the operation of the CoMP eNB 2 in the first embodiment, only the differences are explained. In the step S302, when the valid scheduling information is held (Y in the step S302), the CoMP eNB 2 moves to an operation of evaluating whether transmission to the UE 3 is possible (step S1004). When the transmission to the UE 3 is possible (Y in the step S1004), the CoMP eNB 2 transmits the user data to the UE 3 based on the scheduling information (step S1005) and returns to the step S302. When the transmission to the UE 3 is not possible (N in the step S1004), the CoMP eNB 2 does not transmit the user data to the UE 3 (step S1006) and returns to the step S302.

As criteria for whether the user data can be transmitted to the UE 3, there are for example, load status of radio resources of the CoMP eNB 2, timing when the user data arrives from the CoMP GW 7, and an instruction from the MME 5. When load status of the radio resources of the CoMP eNB 2 is used as the criterion the user data may be transmitted when the usage rate of the radio resources of the CoMP eNB 2 is lower than a predetermined value and not be transmitted when the usage rate is higher than the predetermined value. In the case where timing for the user data arriving from the CoMP GW is used as the criterion, the user data may be transmitted when the user data is received in time for the timing specified in the scheduling information, and the user data may not be transmitted when the user data is not received in time for the timing specified in the scheduling information, for example. In the case where an instruction from the MME is used as the criterion, the user data may be transmitted when the MME 5 instructed to allow the transmission of the user data, and the user data may not be transmitted when the MME 5 instructed to stop the transmission of the user data, for example.

This embodiment has following advantages in addition to the advantages mentioned in the first embodiment. Specifically, the CoMP eNB 2 evaluates whether the user data can be transmitted and stops transmitting the user data depending on the situation. This realizes CoMP that effectively uses the CoMP eNB cell 21.

Fourth Embodiment

This embodiment illustrates an example in which the CoMP GW 7 relays only the user data from the S/P-GW 6 in a similar manner as the first embodiment. Further, this embodiment illustrates an example of transmitting the user data to the UE 3 when the Serving eNB 1 satisfies a predetermined condition.

Figure 21:
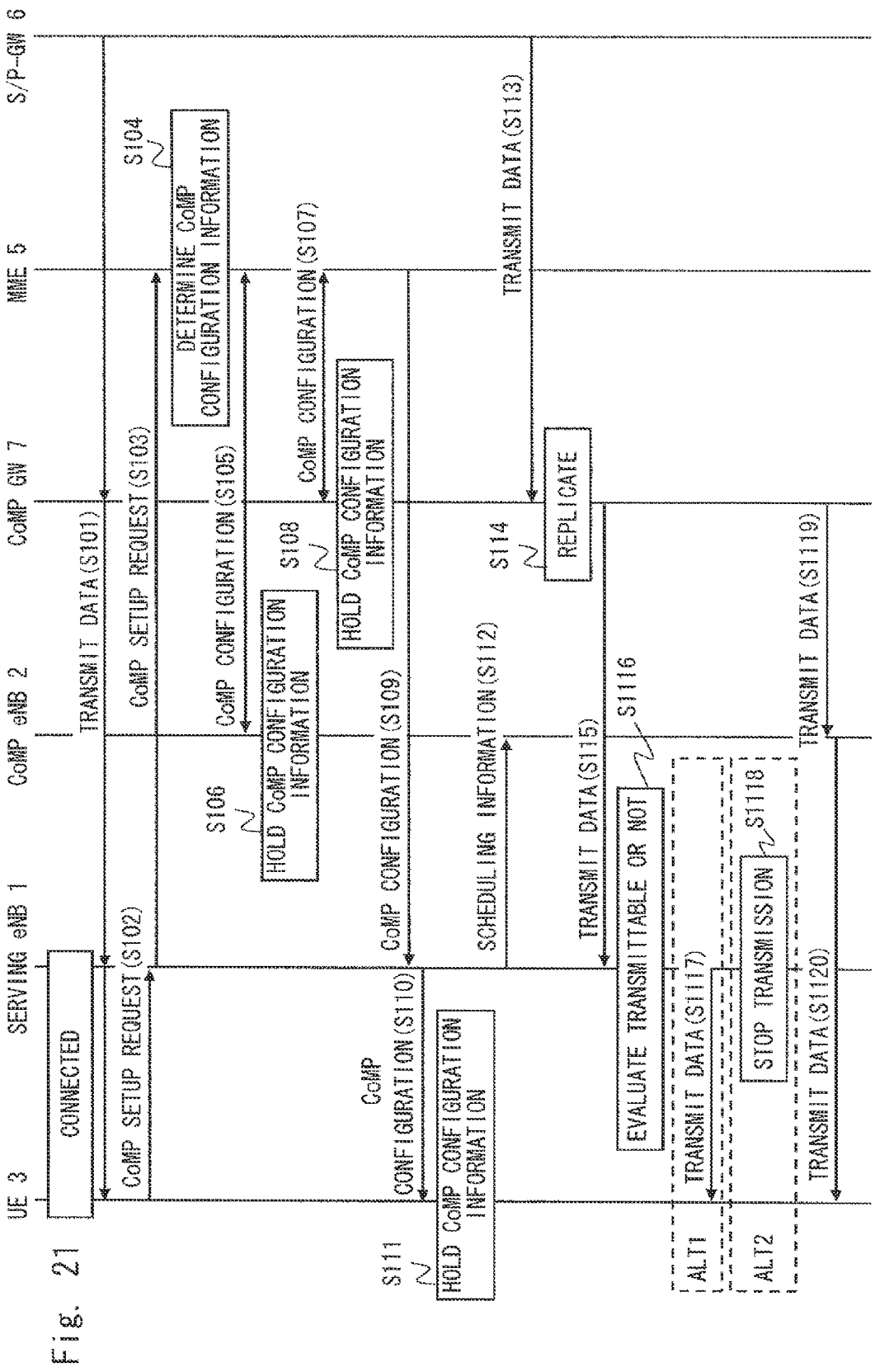
FIG. 21 is a sequence diagram according to a fourth embodiment.

FIG. 21 is a sequence diagram showing the CoMP setup procedure according to this embodiment. Since the steps S101 to S115 are similar to those in the first embodiment, the explanation is omitted. The Serving eNB 1, which received the user data from the CoMP GW 7 at the step S115, evaluates whether the user data can be transmitted to the UE 3 (step S1116). The Serving eNB 1 transmits the user data to the UE 3 when the transmission to the UE 3 is possible (step S1117), whereas when the transmission to the UE 3 is not possible, the Serving eNB 1 stops the transmission to the UE 3 (step S1118). The CoMP eNB 2 receives the user data from the CoMP GW 7 (step S1119) and transmits the user data to the UE 3 (step S1120).

Figure 22:
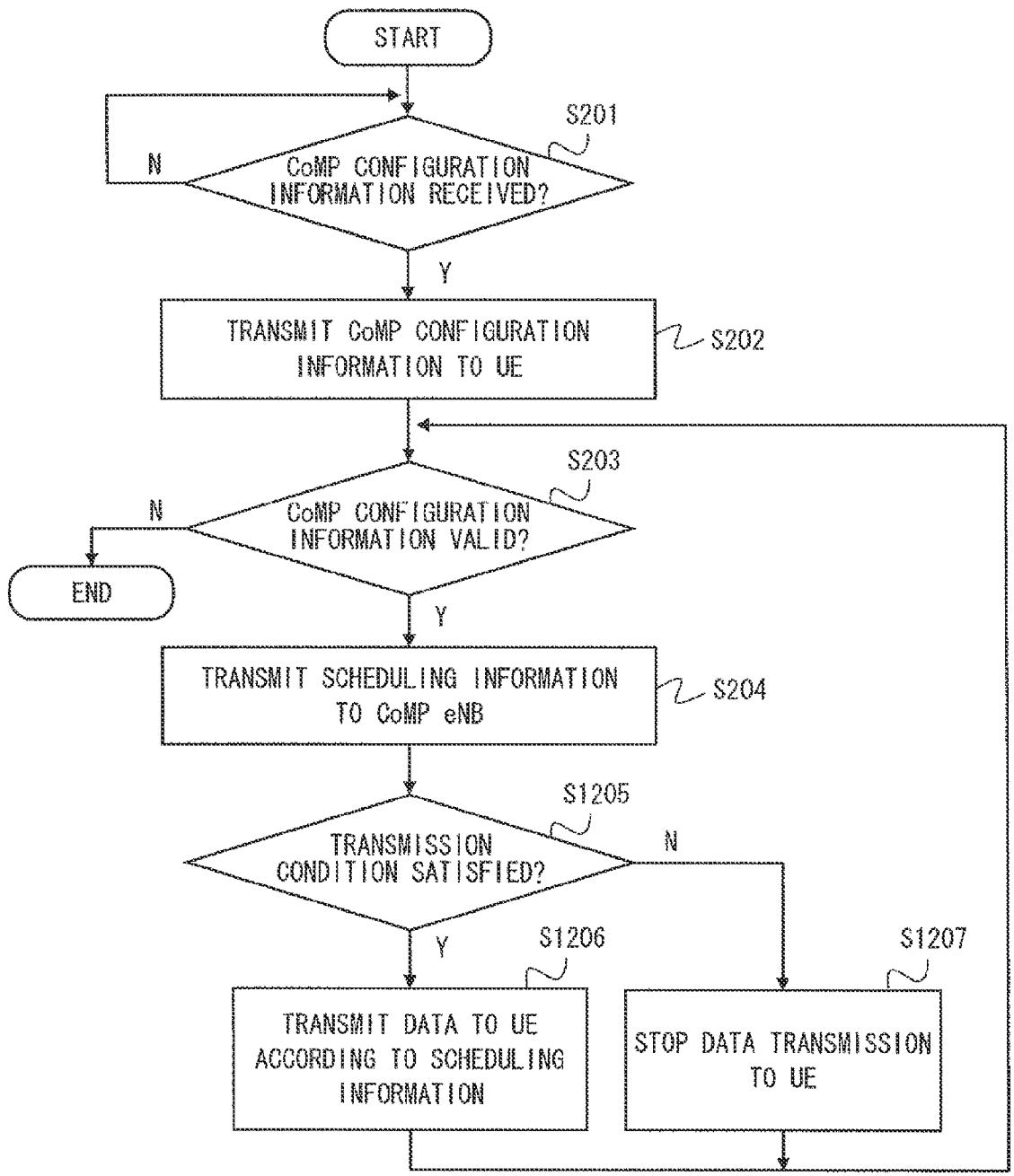
FIG. 22 is a flowchart showing an operation of a Serving eNB according to the fourth embodiment.

Since the operations of the CoMP eNB, the UE, the MME, and the CoMP GW are similar to those in the first embodiment, the explanation is omitted. FIG. 22 is a flowchart showing an example of the CoMP setup operation in the Serving eNB 1. As the steps S201 to S204 are the similar to those of the Serving eNB in the first embodiment, only the differences are explained. Upon transmitting the scheduling information to the CoMP eNB 2 at a predetermined timing (step S204), the Serving eNB 1 moves to an operation of evaluating whether the scheduling information can be transmitted to the UE 3 (step S1205). When the transmission to the UE 3 is possible (Y in the step S1205), the Serving eNB 1 transmits the user data to the UE 3 based on the scheduling information (step S1206) and returns to the step S203. When the transmission to the UE 3 is not possible (N in the step S1205), the Serving eNB 1 does not transmit the user data to the UE 3 (step S1207) and returns to the step S208.

The same criteria as the third embodiment can be used for the criteria to evaluate whether the user data can be transmitted to the UE 3.

This embodiment has the following advantages in addition to the advantages mentioned in the first embodiment. Specifically, the Serving eNB evaluates whether the user data can be transmitted and stops transmitting the user data depending on the situation. This realizes CoMP that effectively uses the Serving eNB cell 11.

Other Embodiments

Although the third and fourth embodiments are considered based on the first embodiment, similar advantageous effects can be achieved when they are based on the second embodiment. Moreover, the third and fourth embodiments may be combined as appropriate.

The first to fourth embodiments explained the case of EPC/E-UTRAN in detail. However, it is obvious that the CoMP implementing method using CoMP GW explained in these embodiments can be applied to other mobile communication systems such as UMTS.

The processes performed by each apparatus (Serving eNB 1, CoMP eNB 2, UE 3, MME 5, S/P-GW 6, and CoMP GW 7) described in the aforementioned first to fourth embodiments can be realized by a computer system including ASIC (Application Specific Integrated Circuit), DSP (Digital Signal Processor), MPU (Micro Processing Unit), or CPU (Central Processing Unit), or a combination thereof. Specifically, the computer system may be caused to execute a program including instructions regarding the procedure of each apparatus explained using the sequence diagrams or flowcharts.

Such a program can be stored and provided to a computer using any type of non-transitory computer readable media accessible by the computer system. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). Further, the program may be provided to a computer using any type of transitory computer readable medium. Examples of transitory computer readable media include electric signals, optical signals, and electromagnetic waves. Transitory computer readable medium can provide the program to a computer via a wired communication line such as electric wires and optical fibers or a wireless communication line.

Further, it is obvious that the present invention is not limited to the aforementioned embodiments, but various modifications can be made within the range not departing from the scope of the present invention.

For example, the whole or part of the embodiments disclosed above can be described as, but not limited to, the following supplementary notes.
(Supplementary Note 1)

A radio communication system comprising:

first and second base stations being capable of wirelessly transmitting packet data addressed to a mobile station;

a first gateway means for transmitting the packet data to the first base station;

a second gateway means capable of communicating with the first base station, the second base station, and the first gateway means; and a control means for signaling information related to a communication path configuration to transfer the packet data, wherein setup of a communication path to transmit the packet data to the first base station from the first gateway means through the second gateway means is performed based on first packet data communication information signaled by the control means, and setup of a communication path to transmit the packet data to the second base station from the second gateway means is performed based on at least one of the first packet data communication information, second packet data communication information signaled by the control means to the first base station, and third packet data communication information signaled by the control means to the second gateway means.
(Supplementary Note 2)

The radio communication system according to Supplementary note 1, wherein the first and second gateway means are integrally disposed on one apparatus.
(Supplementary Note 3)

The radio communication system according to Supplementary note 1, wherein the second gateway means is disposed on the first base station.

The present application claims priority rights of and is based on Japanese Patent Application No. 2010-090346 filed on Apr. 9, 2010 in the Japanese Patent Office, the entire contents of which are hereby incorporated by reference.

REFERENCE SIGNS LIST

1 BASE STATION (Serving ENB)
2 BASE STATION (CoMP ENB)
3 USER EQUIPMENT (UE)
4 CORE NETWORK
5 MOBILITY MANAGEMENT ENTITY (MME)
6 SERVING GATEWAY/PACKET DATA NETWORK GATEWAY (S/P-GW)
7 CoMP GW
11 Serving eNB CELL
31 CoMP eNB Cell
101 RADIO COMMUNICATION UNIT
102 TRANSMISSION DATA PROCESSING UNIT
103 RECEPTION DATA PROCESSING UNIT
104 COMMUNICATION UNIT
105 SCHEDULING CONTROL UNIT
201 RADIO COMMUNICATION UNIT
202 RECEPTION DATA PROCESSING UNIT
203 TRANSMISSION DATA CONTROL UNIT
204 COMMUNICATION UNIT
205 CoMP CONTROL UNIT
301 RADIO COMMUNICATION UNIT
302 RECEPTION DATA PROCESSING UNIT 303 TRANSMISSION DATA CONTROL UNIT
304 CoMP CONTROL UNIT
305 TRANSMISSION DATA CONTROL UNIT
501 LOWER APPARATUS COMMUNICATION UNIT
502 TRANSMISSION DATA PROCESSING UNIT
503 RECEPTION DATA CONTROL UNIT
504 CoMP INFORMATION MANAGEMENT UNIT
601 LOWER APPARATUS COMMUNICATION UNIT
602 TRANSMISSION DATA PROCESSING UNIT
603 RECEPTION DATA PROCESSING UNIT
604 UPPER APPARATUS COMMUNICATION UNIT
605 USER DATA MANAGEMENT UNIT
701 LOWER APPARATUS COMMUNICATION UNIT
702 TRANSMISSION DATA PROCESSING UNIT
703 RECEPTION DATA PROCESSING UNIT
704 UPPER APPARATUS COMMUNICATION UNIT
705 CoMP INFORMATION MANAGEMENT UNIT

The invention claimed is:

1. A radio communication system comprising:
first and second base stations being capable of wirelessly transmitting packet data addressed to a mobile station;
a first gateway unit configured to transmit the packet data to the first base station;
a second gateway unit configured to communicate with the first base station, the second base station, and the first gateway unit; and
a control unit configured to signal information related to a communication path configuration to transfer the packet data, wherein
setup of a first communication path, to transmit the packet data to the first base station from the first gateway unit through the second gateway unit, is performed based on first packet data communication information signaled by the control unit, and
setup of a second communication path, to transmit the packet data to the second base station from the second gateway unit, is performed based on at least one of the first packet data communication information, second packet data communication information signaled by the control unit to the first base station, and third packet data communication information signaled by the control unit to the second gateway unit.

2. The radio communication system according to claim 1, wherein
the first base station is configured to set up the first communication path to receive the packet data from the first gateway unit through the second gateway unit based on the second packet data communication information, and
the second base station is configured to set up the second communication path to receive the packet data from the second gateway unit based on fourth packet data communication information signaled by the second gateway unit or the control unit.

3. The radio communication system according to claim 2, wherein
the second packet data communication information includes configuration information related to a first radio bearer to transmit the packet data to the mobile station from the first base station, and
the fourth packet data communication information includes configuration information related to a second radio bearer to transmit the packet data to the mobile station from the second base station.

4. The radio communication system according to claim 1, wherein the second gateway unit receives the second packet data communication information from the control unit and sets up the second communication path to transmit the packet data to the second base station based on the second packet data communication information.

5. The radio communication system according to claim 2, wherein the second gateway unit generates the fourth packet data communication information using at least one of the first and second packet data communication information.

6. The radio communication system according to claim 1, wherein
the second gateway unit receives the third packet data communication information from the control unit and sets up the second communication path to transmit the packet data to the second base station based on the third packet data communication information.

7. The radio communication system according to claim 1, wherein the first base station transmits, to the second base station, transmission information including information about at least one of a radio transmission timing of the packet data and a radio resource used in the radio transmission of the packet data.

8. The radio communication system according to claim 1, wherein at least one base station of the first and second base stations wirelessly transmits the packet data when a predetermined condition is satisfied.

9. The radio communication system according to claim 8, wherein the predetermined condition is related to a load of the at least one base station.

10. The radio communication system according to claim 9, wherein the at least one base station wirelessly transmits the packet data when the load of the radio resource of the at least one base station is lower than a predetermined value.

11. The radio communication system according to claim 8, wherein
the at least one base station is the second base station, and the predetermined condition is related to a timing when the packet data reaches the second base station.

12. The radio communication system according to claim 11, wherein
the transmission information indicates both the radio transmission timing of the packet data and the radio resource used for the radio transmission of the packet data, and
when the second base station has not received the packet data by a predetermined period prior to the radio communication timing notified in the transmission information, the second base station stops using the radio resource, used by the first base station for the transmission of the packet data, at the radio transmission timing notified in the transmission information.

13. The radio communication system according to claim 8, wherein the predetermined condition is related to an instruction from the control unit or the first base station.

14. The radio communication system according to claim 13, wherein the at least one base station stops the radio transmission of the packet data when the at least one base station receives a transmission stop notification of the packet data from the control apparatus or the first base station.

15. The radio communication system according to claim 1, wherein the control unit or the second gateway unit is configured to notify the mobile station of radio connection information necessary to connect to the second base station.

16. The radio communication system according to claim 15, wherein the radio connection information is notified to the mobile station through a downlink control channel between the first base station and the mobile station.

17. The radio communication system according to claim 1, wherein the packet data transmitted to the first base station by the second gateway unit includes the same content as the packet data transmitted to the second base station by the second gateway unit.

18. A communication apparatus capable of communicating with first and second base stations that are capable of wirelessly transmitting packet data addressed to a mobile station, a gateway apparatus that transmits the packet data to the first base station, and a control apparatus that signals information related to a communication path configuration to transfer the packet data, the communication apparatus comprising:

a control unit configured to set up a second communication path to transmit the packet data to the second base station from the communication apparatus based on at least one of the first to third packet data control information; and a transmission unit configured to transmit the packet data transmitted from the gateway apparatus to the first and second base stations, wherein the first packet data communication information is related to a configuration of a first communication path to transmit the packet data to the first base station from the gateway apparatus through the communication apparatus and is signaled by the control apparatus, the second packet data communication information is related to a communication path configuration of a second communication path to transmit the packet data to the second base station from the communication apparatus and is signaled by the control apparatus to the first base station, and the third packet data communication information is signaled by the control apparatus to the communication apparatus.

19. The communication apparatus according to claim 18, wherein the control unit receives the second packet data communication information from the control apparatus and sets up the second communication path to transmit the packet data to the second base station based on the second packet data communication information.

20. The communication apparatus according to claim 18, wherein the control unit generates fourth packet data communication information, related to a configuration of the second communication path to receive the packet data from the communication apparatus by the second base station, using at least one of the first and second packet data communication information and transmits the fourth packet data communication information to the second base station.

21. The communication apparatus according to claim 18, wherein the control unit receives the third packet data communication information from the control apparatus and sets up the second communication path to transmit the packet data to the second base station based on the third packet data communication information.

22. A method for controlling simultaneous transmission from multiple base stations performed by a communication apparatus, the communication apparatus being disposed communicatively with first and second base stations capable of wirelessly transmitting packet data addressed to a mobile station, a gateway apparatus that transmits the packet data to the first base station, and a control apparatus that signals information related to a communication path configuration to transfer the packet data, the method comprising:

setting up a second communication path to transmit the packet data to the second base station from the communication apparatus based on at least one of first to third packet data control information; and transmitting the packet data transmitted from the gateway apparatus to the first and second base stations, wherein the first packet data communication information is related to a configuration of a first communication path to transmit the packet data to the first base station from the gateway apparatus through the communication apparatus and is signaled by the control apparatus, the second packet data communication information is related to a configuration of the second communication path to transmit the packet data to the second base station from the communication apparatus and is signaled by the control apparatus to the first base station, and the third packet data communication information is signaled by the control apparatus to the communication apparatus.

23. The method according to claim 22, further comprising receiving the second packet data communication information from the control apparatus, wherein the setting up the second communication path includes setting up the second communication path to transmit the packet data to the second base station from the communication apparatus based on the second packet data communication information.

24. The method according to claim 22, further comprising:

generating fourth packet data communication information, related to a configuration of the second communication path to receive the packet data from the communication apparatus by the second base station, using at least one of the first and second packet data communication information; and transmitting the fourth packet data communication information to the second base station.

25. The method according to claim 22, further comprising receiving the third packet data communication information from the control apparatus, wherein the setting up the second communication path includes setting up the second communication path to transmit the packet data to the second base station from the communication apparatus based on the third packet data communication information.

26. A non-transitory computer readable medium storing a program for causing a computer to execute a method, performed by a communication apparatus, for controlling simultaneous transmission from multiple base stations, the communication apparatus being disposed communicatively with first and second base stations capable of wirelessly transmitting packet data addressed to a mobile station, a gateway apparatus that transmits the packet data to the first base station, and a control apparatus that signals information related to a communication path configuration to transfer the packet data, the method comprising:

setting up a second communication path to transmit the packet data to the second base station from the communication apparatus based on at least one of first to third packet data control information; and transmitting the packet data transmitted from the gateway apparatus to the first and second base stations, wherein the first packet data communication information is related to a configuration of a first communication path to transmit the packet data to the first base station from the gateway apparatus through the communication apparatus and is signaled by the control apparatus, the second packet data communication information is related to a configuration of the second communication path to transmit the packet data to the second base station from the communication apparatus and is signaled by the control apparatus to the first base station, and the third packet data communication information is signaled by the control apparatus to the communication apparatus.

* * * * *

UNITED STATES PATENT AND TRADEMARK OFFICE
CERTIFICATE OF CORRECTION

PATENT NO. : 8,885,545 B2  
APPLICATION NO. : 13/636934  
DATED : November 11, 2014  
INVENTOR(S) : Hiroaki Aminaka Page 1 of 1

It is certified that error appears in the above-identified patent and that said Letters Patent is hereby corrected as shown below:

In the Claims

Column 19, Line 17: In Claim 18, after "related to a" delete "communication path"

Signed and Sealed this
Fourth Day of August, 2015

Michelle K. Lee
*Director of the United States Patent and Trademark Office*